United States Patent
Teranishi et al.

(10) Patent No.: US 9,075,719 B2
(45) Date of Patent: Jul. 7, 2015

(54) COMPUTER SYSTEM AND STORAGE SYSTEM

(75) Inventors: Mika Teranishi, Ninomiya (JP); Hiroji Shibuya, Odawara (JP); Shunji Murayama, Hiratsuka (JP); Toshio Kimura, Odawara (JP); Kazushige Nagamatsu, Odawara (JP)

(73) Assignee: Hitachi, Ltd., Tokyo (JP)

( * ) Notice: Subject to any disclaimer, the term of this patent is extended or adjusted under 35 U.S.C. 154(b) by 565 days.

(21) Appl. No.: 13/391,770

(22) PCT Filed: Feb. 10, 2012

(86) PCT No.: PCT/JP2012/000900
§ 371 (c)(1),
(2), (4) Date: Feb. 22, 2012

(87) PCT Pub. No.: WO2013/118188
PCT Pub. Date: Aug. 15, 2013

(65) Prior Publication Data
US 2013/0212335 A1    Aug. 15, 2013

(51) Int. Cl.
*G06F 12/00* (2006.01)
*G06F 12/08* (2006.01)

(52) U.S. Cl.
CPC ........................... *G06F 12/08* (2013.01)

(58) Field of Classification Search
USPC ................................................. 711/138
See application file for complete search history.

(56) References Cited

U.S. PATENT DOCUMENTS 4,268,907 A * 5/1981 Porter et al. ................. 711/138
4,525,780 A * 6/1985 Bratt et al. ................... 711/163
5,247,639 A * 9/1993 Yamahata ..................... 711/138
5,875,464 A * 2/1999 Kirk .............................. 711/129
6,065,099 A * 5/2000 Clark et al. ................... 711/133

(Continued)

FOREIGN PATENT DOCUMENTS

| EP | 1 764 678 A1 | 3/2007 |
| EP | 1 947 563 A2 | 7/2008 |
| JP | 2007-310495 A | 11/2007 |

OTHER PUBLICATIONS

Norman P. Jouppi, "Cache Write Policies and Performance", WRL Research Report 91/12, Western Research Laboratory, Dec. 1991, pp. 1-48, http://www.hpl.hp.com/techreports/Compaq-DEC/WRL-91-12.pdf.*

(Continued)

*Primary Examiner* — Christopher Birkhimer
(74) *Attorney, Agent, or Firm* — Foley & Lardner LLP

(57) ABSTRACT

A storage system is migrated without stopping service provision by a host computer. By this means, in a migration-source storage system, data of the cache memory is destaged, and, next, data received from the host computer is directly written in a logical unit by bypassing the cache memory. On the other hand, in a migration-destination storage system, communication with the migration-source storage system is performed to set setting information of a logical unit of the migration object into a logical unit management table and set a writing mode for the cache memory to a cache-bypass mode. After that, the migration-source storage system blocks a path to the host computer. The migration-destination storage system receives a report of the path block from the migration-source storage system and then opens a path between the own system and the host computer.

14 Claims, 23 Drawing Sheets

State D

State E

(56) References Cited

U.S. PATENT DOCUMENTS

| | | | |
|---|---|---|---|
| 6,223,266 B1* | 4/2001 | Sartore | 711/170 |
| 7,065,613 B1* | 6/2006 | Flake et al. | 711/132 |
| 7,398,484 B2* | 7/2008 | Ruf | 716/123 |
| 7,873,785 B2* | 1/2011 | Olukotun | 711/118 |
| 7,975,109 B2* | 7/2011 | McWilliams et al. | 711/147 |
| 8,244,969 B2* | 8/2012 | McWilliams et al. | 711/103 |
| 2003/0046492 A1* | 3/2003 | Gschwind et al. | 711/118 |
| 2003/0101317 A1 | 5/2003 | Mizuno et al. | |
| 2006/0248489 A1* | 11/2006 | Ruf | 716/10 |
| 2007/0271434 A1 | 11/2007 | Kawamura et al. | |
| 2011/0047437 A1* | 2/2011 | Flynn | 714/758 |
| 2011/0258391 A1* | 10/2011 | Atkisson et al. | 711/118 |
| 2011/0289263 A1* | 11/2011 | McWilliams et al. | 711/103 |
| 2012/0036330 A1 | 2/2012 | Saito et al. | |
| 2012/0124294 A1* | 5/2012 | Atkisson et al. | 711/135 |
| 2012/0198174 A1* | 8/2012 | Nellans et al. | 711/133 |
| 2012/0198175 A1* | 8/2012 | Atkisson | 711/135 |

OTHER PUBLICATIONS

PCT International Search Report and Written Opinion on application PCT/JP2012/000900 mailed Jul. 26, 2012; 14 pages.

* cited by examiner

Fig. 2

209 (Storage A)

| LDEV ID | Storage apparatus name | Storage serial number | Virtual source LDEV ID | Assigned capacity | Storage port name | Host group name | WWN | LUN ID | Connection state |
|---|---|---|---|---|---|---|---|---|---|
| 1001 | StorageA | 11H12345 | Real | 500GB | 1A | Host01 | 1000 0000AA 000011 | 0000 | Currently connected |
| 1001 | StorageA | 11H12345 | Real | 500GB | 2A | Host01 | 1000 0000AA 000012 | 0000 | Currently migrated |
| 2001 | StorageX | 10H3456 | 0001 | 800GB | 1B | Host02 | 1000 0000AB 000021 | 0000 | Disconnection |
| 2001 | StorageX | 10H3456 | 0001 | 800GB | 2B | Host02 | 1000 0000AB 000022 | 0000 | Migration completion |
| . . | | | | | | | | | . . |

| Apparatus name | StorageA |
|---|---|
| Apparatus model number | H-7777 |
| Serial number | 11H12345 |
| Pack date | 2009/08 |

| Apparatus name | StorageB |
|---|---|
| Apparatus model number | H-8888 |
| Serial number | 12H2345 |
| Pack date | 2010/04 |

| Apparatus name | StorageX |
|---|---|
| Apparatus model number | H-6666 |
| Serial number | 10H3456 |
| Pack date | 2008/06 |

Fig. 4

309 (Storage B)

| LDEV ID | Storage apparatus name | Storage serial number | Virtual source LDEV ID | Assigned capacity | Storage port name | Host group name | WWN | LUN ID | Connection state |
|---|---|---|---|---|---|---|---|---|---|
| 0001 | StorageB | 12H2345 | - | 300GB | 1A | Host21 | 2000 0000CC 000033 | 0000 | Currently connected |
| 0001 | StorageB | 12H2345 | - | 300GB | 2A | Host21 | 2000 0000CC 000034 | 0000 | Standby |
| 0002 | StorageA | 11H12345 | 1001 | 500GB | 1B | Host01 | 1000 0000AA 000011 | 0000 | Disconnectable |
| 0002 | StorageA | 11H12345 | 1001 | 500GB | 2B | Host01 | 1000 0000AA 000012 | 0000 | Currently migrated |
| 0003 | StorageX | 10H3456 | 0001 | 800GB | 1C | Host02 | 1000 0000AB 000021 | 0000 | Standby |
| 0003 | StorageX | 10H3456 | 0001 | 800GB | 2C | Host02 | 1000 0000AB 000022 | 0000 | Currently connected |
| .. | | | | | | | | | .. |

Fig. 6

| Host01 | | | |
|---|---|---|---|
| LDEV ID | | Migration state | |
| [-] 1001 | | Currently migrated | |
| Migration management information | | Migration source storage | Migration destination storage |
| | Assigned capacity | 500GB | 500GB |
| | LUN ID | 0 | 0 |
| | Connection state | Disconnected | Migration start |
| | Path | P1 | P1 |
| | Port name | 2A | 2A |
| | WWN | 1000 0000AA 000012 | 1000 0000AA 000012 |
| | Storage apparatus name | StorageA | StorageA |
| | Storage serial number | 11H12345 | 11H12345 |
| [+] 2001 | | Migration completion | |
| [+] 3001 | | Disconnected | |

830

State C

State D

State E

State A

State B

State C

State D

State E

Fig. 14

| Connection state combination | Storage B | |
|---|---|---|
| Storage A | Examples 1 and 2 | Examples 3 and 4 |
| Currently connected | Disconnectable | Disconnectable |
| Currently migrated | Currently migrated | Currently migrated |
| Migration completion | Connection permission wait | Currently connected |
| Block permission | Currently connected | - |
| Disconnection | Standby | Standby |

COMPUTER SYSTEM AND STORAGE SYSTEM

TECHNICAL FIELD

The present invention relates to a storage system having a storage virtualization technique and a computer system configured with the storage system and a management terminal of the storage system.

BACKGROUND ART

Currently, the amount of data treated by a computer system is dramatically increasing. With this trend, the amount of data stored in a storage system is dramatically increasing. Consequently, in a company's computer system, it is required to simplify or streamline complex management in addition to expansion of a storage system. Further, in the company's computer system, a data storage term is long. Therefore, during an operation of the computer system, a device installation or exchange operation is required.

In the present system, however, when a connection destination of a host computer (hereinafter referred to as "host") is migrated from an operating storage system (hereinafter referred to as "storage A") to a different storage system (hereinafter referred to as "storage B"), a system manager is required to manually set unique information of the migration-source storage A to the migration-destination storage B during the service outage.

CITATION LIST

Patent Literature

PTL 1: JP Patent Publication (Kokai) No. 2007-310495 A (US2007/0271434)

SUMMARY OF INVENTION

Technical Problem

However, the manual setting operation is complicated and requires long operation time. Further, in a computer system used in a mission-critical operation, it is not possible to stop the provision of services at all.

Further, in the present method, it is not necessarily possible to maintain the consistency of data before and after the storage migration.

Solution to Problem (A) Here, in one invention, a storage system that realizes storage migration processing by the following processing process is provided.

First, a migration-source first storage system applies a standby state to the writing of data for a first cache memory and destages data existing in the first cache memory to a first logical unit.

Next, the first storage system directly writes data received from a host computer via a first path, in the first logical unit by bypassing the first cache memory. During the time, a second storage system sets setting information of the first logical unit into a management table of a second logical unit by communication with the first storage system. Also, the second storage system sets a writing mode of the second cache memory to a cache-bypass mode.

After that, the first storage system blocks the first path and the second storage system logically opens a preset second path between the second storage system and the host computer. That is, path switching is performed. Immediately after the path switching, if the second storage system receives data through the second path, the second storage system writes data received in the cache-path-through mode in the first logical unit.

After this path switching, the first and second storage systems set the writing modes for the first and second cache memories to a cache use mode, respectively, and write data in the first logical unit via the first and second cache memories.

(B) Also, in another invention, a storage system that realizes storage migration processing by the following processing process is provided.

First, a migration-source first storage system applies a standby state to the writing of data for a first cache memory and destages data existing in the first cache memory to a first logical unit.

Next, the first storage system directly writes data received from a host computer via a first path, in the first logical unit by bypassing the first cache memory. During the time, a second storage system sets setting information of the first logical unit into a management table of a second logical unit by communication with the first storage system and logically sets a second path used for connection with the host computer. Here, the second path does not physically exist.

After that, the first storage system blocks the first path and then the second storage system opens the second path after a physical connection between the second path and the host computer.

After the path switching, the second storage system writes data received via the second path in the first logical unit via the second cache memory.

After this writing, the first storage system sets a writing mode of the first cache memory to a cache use mode and writes data in the first logical unit via the first and second cache memories.

(C) Also, if there is a third storage system which is externally connected to the first storage system, a system migration from the third storage system to the second storage system is performed in the same way as the operation of migrating a system from the first storage system to the second storage system.

Advantageous Effects of Invention

According to the present invention, in a computer system to which a storage virtualization technique is applied, it is possible to migrate a storage system connected to a host computer without stopping services provided by the host computer.

It should be noted that, in the case of (A) where the second path is physically connected before the first path is logically blocked, it is possible to use a plurality of paths at the time of storage migration, so that it is possible to reduce performance degradation due to IO load, compared to a case where the second path is physically connected after the first path is blocked.

On the other hand, in the case of (B) where the second path is physically connected after the first path is blocked, there is no influence due to fault or defect of multiple paths at the time of storage migration, so that it is possible to safely migrate a storage compared to a case where the second path is physically connected before the first path is logically blocked.

Other problems, configurations and effects than the above will be clarified in explanation of the following examples.

BRIEF DESCRIPTION OF DRAWINGS

FIG. 2 is a view showing an example of a logical unit management table on the side of the storage A.

FIG. 3 is a view showing an example of storage apparatus basic information.

FIG. 4 is a view showing an example of a logical unit management table on the side of the storage B.

FIG. 6 is a view showing an example of a management screen for detail check.

FIG. 7-1 is a view which is used for explaining a detailed image of storage migration processing according to Example 1 (states A to C).

FIG. 7-2 is a view which is used for explaining a detailed image of storage migration processing according to Example 1 (states D and E).

FIG. 10-1 is a view which is used for explaining a detailed image of storage migration processing according to Example 2 (states A and B).

FIG. 10-2 is a view which is used for explaining a detailed image of storage migration processing according to Example 2 (state C).

FIG. 10-3 is a view which is used for explaining a detailed image of storage migration processing according to Example 2 (state D).

FIG. 10-4 is a view which is used for explaining a detailed image of storage migration processing according to Example 2 (state E).

FIG. 11-1 is a view which is used for explaining a detailed image of storage migration processing according to Example 3 (states A to C).

FIG. 11-2 is a view which is used for explaining a detailed image of storage migration processing according to Example 3 (states D and E).

FIG. 13-1 is a view which is used for explaining a detailed image of storage migration processing according to Example 4 (state A).

FIG. 13-2 is a view which is used for explaining a detailed image of storage migration processing according to Example 4 (state B).

FIG. 13-3 is a view which is used for explaining a detailed image of storage migration processing according to Example 4 (state C).

FIG. 13-4 is a view which is used for explaining a detailed image of storage migration processing according to Example 4 (state D).

FIG. 13-5 is a view which is used for explaining a detailed image of storage migration processing according to Example 4 (state E).

FIG. 14 is a view which is used for explaining a difference between connection states to a logical unit in examples.

DESCRIPTION OF EMBODIMENTS

Figure 1:
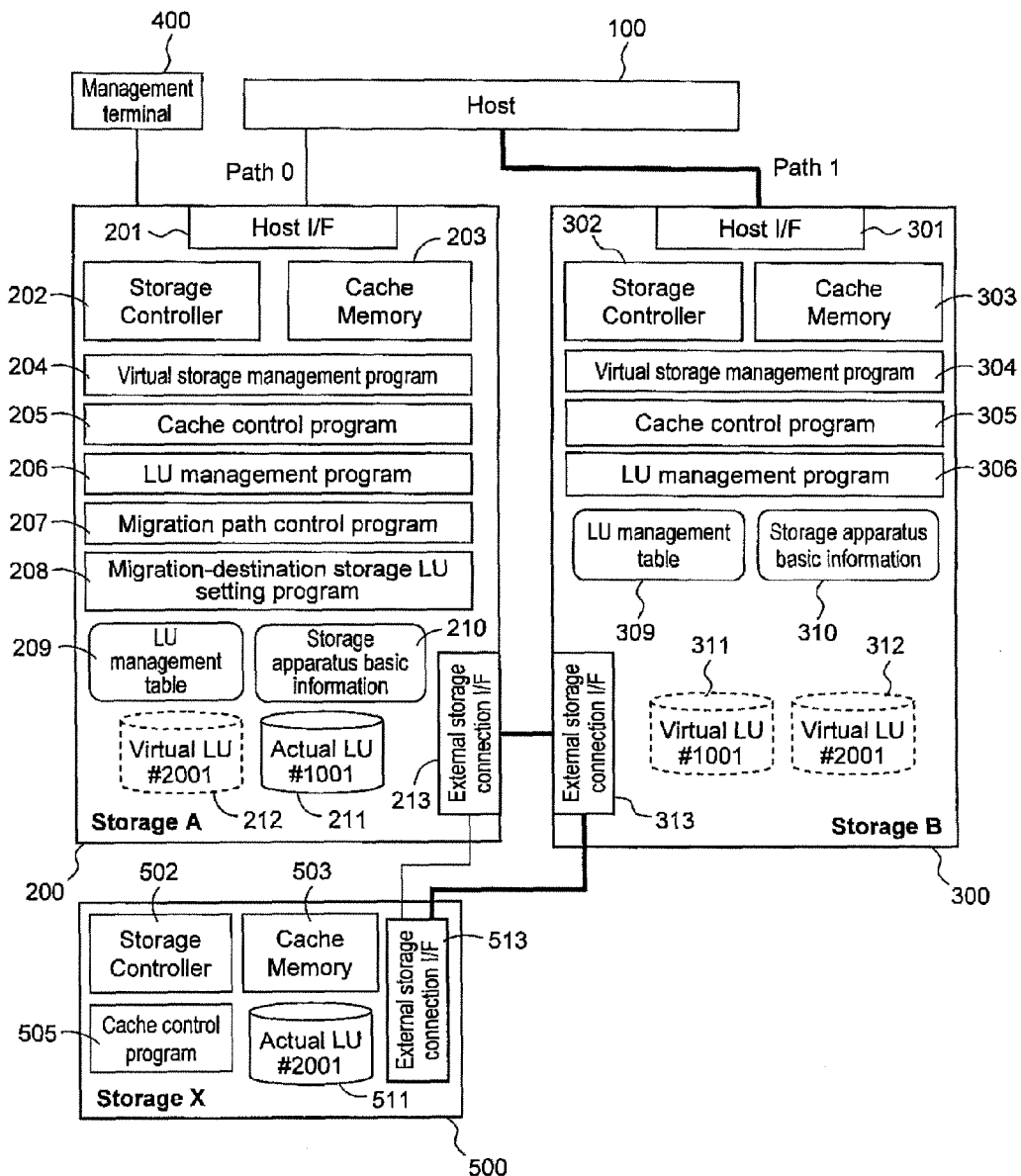
FIG. 1 is a view which is used for explaining a configuration of a computer system used in an example.

In the following, embodiments of the present invention will be explained in detail with reference to the accompanying drawings. It should be noted that, in all figures for explaining the embodiments, the same or related reference numeral will be assigned to the same member having the same function, and its repetitive explanation will be omitted. Further, in the following embodiments, the same or similar parts will not be explained essentially and repeatedly unless the explanation is especially required.

[Overall System Configuration]

Before the explanation of each example, the computer system configuration presumed in each example will be explained. In the following, a basic configuration of a computer system will be explained based on FIG. 1. The computer system shown in FIG. 1 is configured with a host 100, a migration-source storage system 200 (storage A), a migration-destination storage system 300 (storage B), a management terminal 400 and an external storage system (storage X). It should be noted that, in the examples described below, there is an example where an external storage system (i.e. storage X) is not required.

[Host Configuration]

The host 100 is configured with an open-system computer or a mainframe-system computer. The host 100 has a CPU, memory, storage apparatus, input apparatus, display apparatus and storage interface (not shown). The storage apparatus is configured with, for example, a disk apparatus, a magnetic optical disk, and so on. The host 100 reads an operating system and an application program(s) stored in the storage apparatus and performs predetermined information processing. The input apparatus is configured with, for example, a keyboard, a mouse, and so on.

The host 100 accepts an operation input of a host manager via the input apparatus and displays an information processing result on the display apparatus. The storage interface is configured with a port, a LAN adapter, and so on. It is assumed that the port supports a fiber channel interface having an SCSI (Small Computer System Interface) as a higher protocol. It should be noted that the port may support an IP network interface having an SCSI as a higher protocol.

[Configuration of Storage A]

As described above, in each example, the storage A is used as a migration-source storage. As described later, the storage A has a function of connecting with an external storage. Before a storage migration, the storage A manages the storage X as an external storage. It should be noted that, after the storage migration, the storages A and X are managed as external storages of the storage B.

The storage A shown in FIG. 1 has main components of a host interface 201, a storage controller 202, a cache memory 203, a virtual storage management program 204, a cache control program 205, a logical unit management program 206, a migration path control program 207, a migration-destination storage logical unit setting program 208, a logical unit management table 209, a storage apparatus basic information 210, an actual logical unit 211, a virtual logical unit 212, an external storage connection interface 213.

The host interface 201 is configured with a port, an adapter, and so on. The port may support a fiber channel interface having an SCSI (Small Computer System Interface) as a higher protocol or an IP network interface having the SCSI as a higher protocol.

The storage controller 202 is configured with a CPU, an embedded memory and a storage apparatus. The embedded memory or storage apparatus of the storage controller 202 stores, for example, the virtual storage management program 204, the cache control program 205, the logical unit management program 206, the migration path control program 207, the migration-destination storage logical unit setting program 208, the logical unit management table 209 and the storage apparatus basic information 210.

The storage controller 202 reads these programs, the table and the basic information and performs predetermined information processing. The storage controller 202 specifies a logical unit to be accessed, based on information included in I/O data received from the host 100 via the port (i.e. port ID, LUN (Logical Unit Number)). The I/O data in this case includes at least a Read command and a Write command.

The cache memory 203 denotes a temporary memory area that relays the reading/writing of the I/O data between the host 100 and the logical unit (such as the actual logical unit 211 and the virtual logical unit 212). However, I/O data is not necessarily written in the cache memory 203. In the present specification, a mode for writing I/O data in the cache memory 203 will be referred to as "cache use mode." Also, a mode for not writing I/O data in the cache memory 203 will be referred to as "cache-path-through mode."

The virtual storage management program 204 denotes a program for performing integrated management of a plurality of different-type/same-type storage apparatuses as if they are one storage apparatus. The virtual storage management program 204 is connected to a management-parent storage apparatus via, for example, the fiber channel interface. Further, the virtual storage management program 204 virtually structures a plurality of different-type storages as one storage by mapping based on information of the logical unit management table 209 and the storage apparatus basic information 210. Here, "mapping" means that a device address space is associated with (or assigned to) a different device address space. As a result, a logical unit configured by mapping can perform volume management and capacity management in the same way as an internal disk.

In the following, an example of an intermediate memory layer forming the logical unit 6 will be shown. Examples of the intermediate memory layer include, for example, a logical device (LDEV), a virtual device (VDEV) and an expanded device (EDEV). The logical device denotes, for example, a device of a RAID (Redundant Arrays of Inexpensive Disks) type for receiving provision of memory areas from a plurality of same-type physical devices. The logical unit 6 does not necessarily require all the devices described above. That is, part of the devices may not be provided. Also, a different device (such as a device group (DEVGr) (described later)) added to these devices may be included in a management configuration of the logical unit 6. It should be noted that, if the storage A has a physical device (PDEV), the physical device and an expanded device belong to the same intermediate memory layer. Here, as a physical device, for example, an SSD (Solid State Drive), an SAS (Serial Attached SCSI), an SATA (Serial Advanced Technology Attachment) are used. The connection relationship between layers adopts not only one-to-one connection but also one-to-many or many-to-one connection.

The cache control program 205 denotes a program that controls the reading/writing of I/O data to the cache memory 203. For example, the cache control program 205 controls the switching of the cache use mode and the cache-path-through mode. Further, the cache control program 205 controls an operation of destaging I/O data from the cache memory 203.

The logical unit management program 206 denotes a program that controls an execution of events (such as reading, setting and updating) required to manage the logical unit management table 209.

The migration path control program 207 denotes a dedicated program used at the time of storage migration. The migration path control program 207 provides a function of forcibly blocking a path used for connection with the host 100.

The migration-destination storage logical unit setting program 208 provides a function of taking over logical unit information set in the own storage to a migration-destination storage (storage B in this example) and setting a virtual logical unit in the destination storage.

The logical unit management table 209 denotes a table that manages an actual logical unit and virtual logical unit set in the own storage. An example will be shown in FIG. 2. The table shown in FIG. 2 manages the "LDEV ID," the "storage apparatus name," the "storage serial number," the "virtual source LDEV ID," the "assigned capacity," the "storage port name," the "host group name," the "WWN," "LUN ID" and the "connection state" of each storage. It should be noted that the "connection state" includes "currently connected," "connection permission wait," "disconnectable," "currently migrated," "migration completion," "block permission," "disconnection," "wait" and so on.

The storage apparatus basic information 210 denotes a table that manages basic information of a storage forming the computer system. An example will be shown in FIG. 3. The table shown in FIG. 3 manages the "apparatus names," "apparatus model numbers," "serial numbers" and "pack dates" of the storages A, B and X, respectively.

The actual logical unit 211 denotes a logical unit set on a physical storage apparatus. The virtual logical unit 212 denotes a logical unit which is virtually set. It should be noted that the virtual logical unit 212 is used to manage an actual logical unit 511 of the storage X. That is, access to I/O data for the actual logical unit of the storage X is performed via the virtual logical unit 212.

The external storage connection interface 213 denotes an interface connecting between the own storage and an external storage, which is configured with, for example, a port and an adapter. The port may support a fiber channel interface having an SCSI (Small Computer System Interface) as a higher protocol or an IP network interface having the SCSI as a higher protocol. As shown in FIG. 1, the external storage connection interface 213 is used for connection with the storage B or the storage X.

[Configuration of Storage B]

As described above, in each example, the storage B is used as a migration-destination storage. That is, the storage B corresponds to a succession machine of the storage A. As described later, the storage B equally has a function of connecting an external storage. After a storage migration, the storage B manages the storages A and X as external storages. It should be noted that a configuration described below represents only a functional configuration required to function the storage B as a migration-destination storage. Actually, the same function as that of the storage A is equally provided in preparation for a case where the storage B provided as a migration-source storage in future.

The storage B has main components of a host interface 301, a storage controller 302, a cache memory 303, a virtual storage management program 304, a cache control program 305, a logical unit management program 306, a logical unit management table 309, a storage apparatus basic information 310, a virtual logical unit 311, a virtual logical unit 312, an external storage connection interface 313.

Configurations of the host interface 301, the storage controller 302, the cache memory 303, the virtual storage management program 304, the cache control program 305 and the logical unit management program 306 are the same as those of the host interface 201, the storage controller 202, the cache memory 203, the virtual storage management program 204, the cache control program 205 and the logical unit management program 206 of the storage A.

Figures 1, 10:
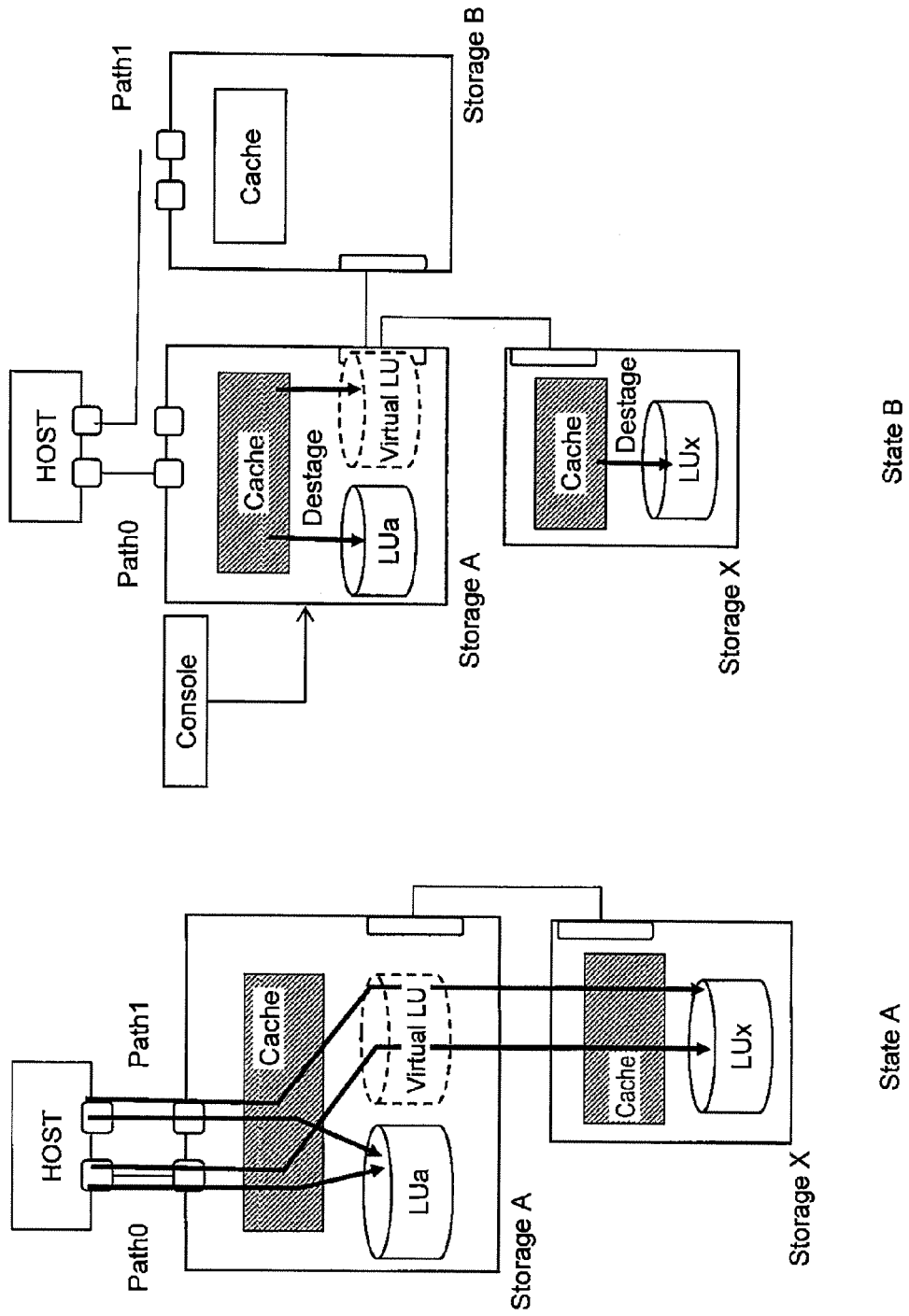
Figures 2, 10:
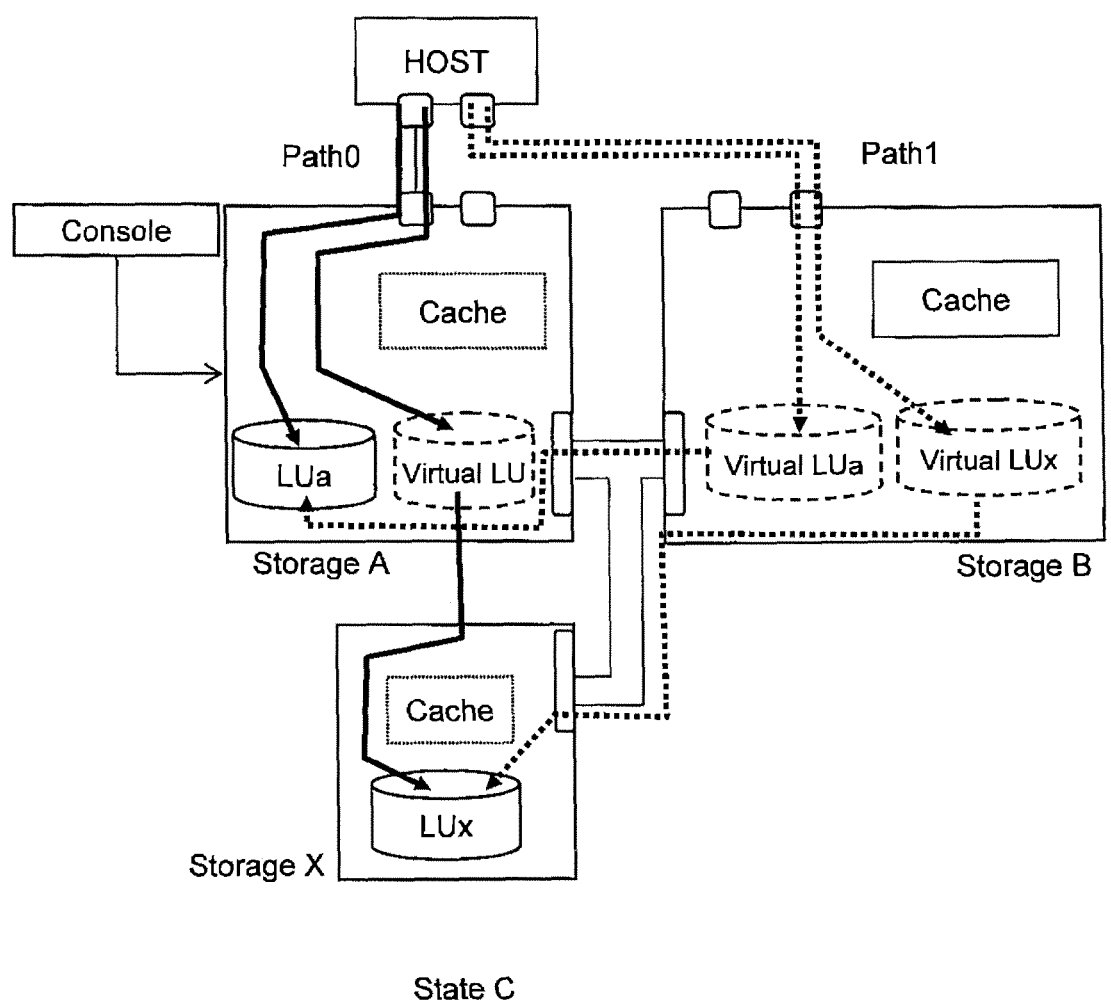
Figures 3, 10:
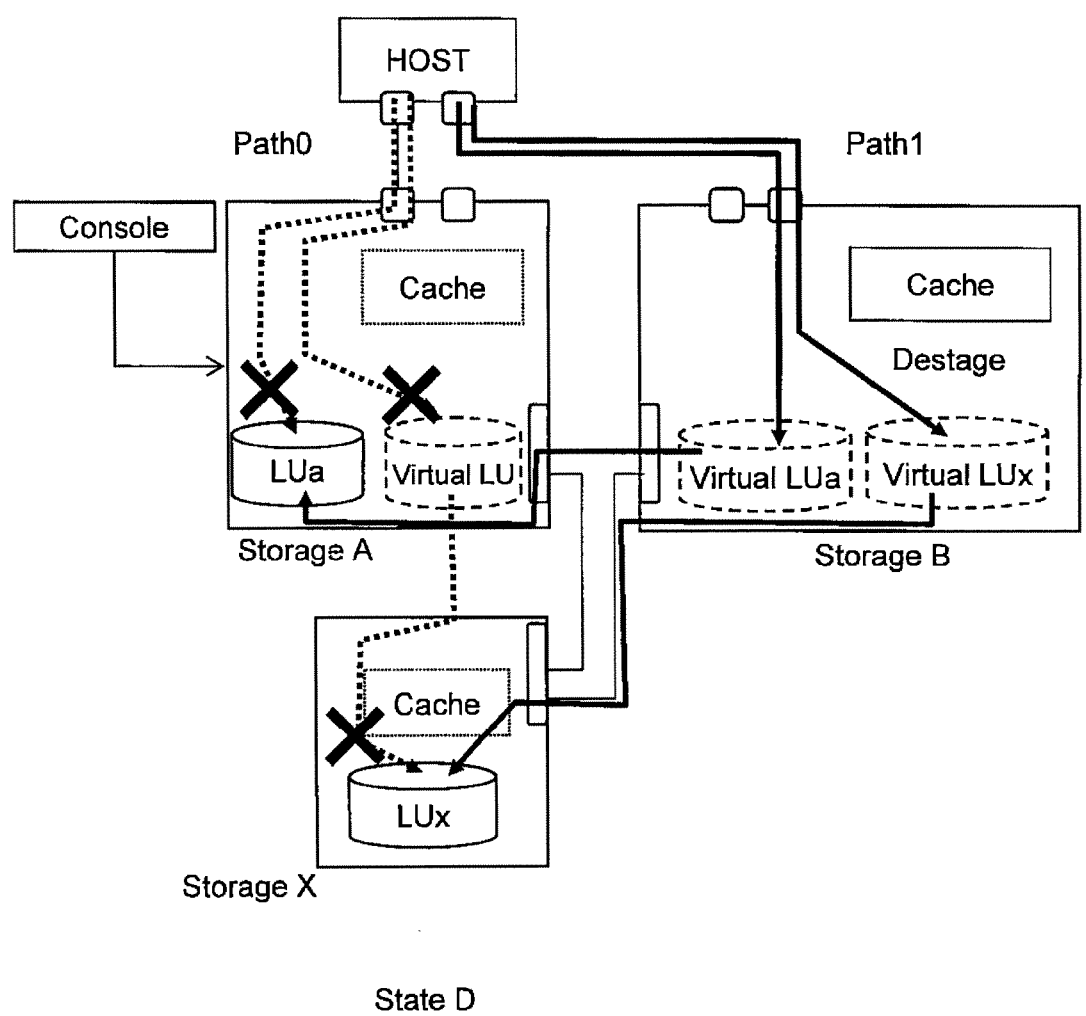
Figures 4, 10:
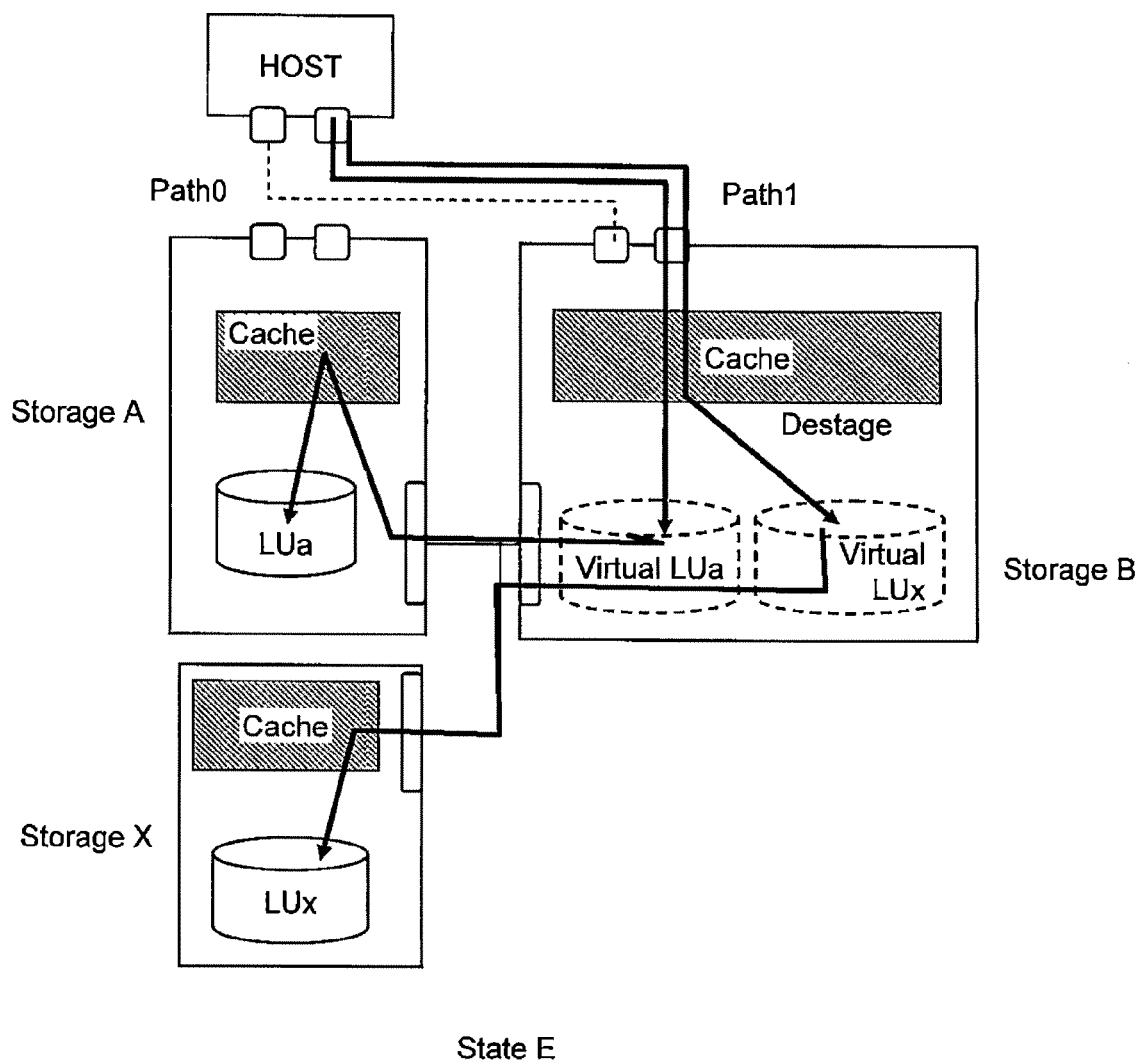

The logical unit management table 309 denotes a table that manages an actual logical unit and virtual logical unit set in the own storage. An example will be shown in FIG. 4. The table configuration shown in FIG. 4 is the same as the table configuration shown in FIG. 2. However, the storage B manages the storages A and X as external storages, and therefore the logical unit management table 309 includes information of the logical unit management table 209 shown in FIG. 2.

The storage apparatus basic information 310 is the same as the storage apparatus basic information 210 described above. That is, it corresponds to information in the table shown in FIG. 3.

The virtual logical unit 311 denotes a logical unit that is virtually generated to manage the actual logical unit 211 of the storage A. The virtual logical unit 312 denotes a logical unit that is virtually generated to manage the actual logical unit 511 of the storage X.

The configuration of the external storage connection interface 313 is the same as the configuration of the external storage connection interface 213 of the storage A. In the case of FIG. 1, the external storage connection interface 313 is used for connection with the storage A or the storage X.

[Management Terminal Configuration]

The management terminal 400 denotes a terminal apparatus that manages progression of system migration processing. As shown in FIG. 1, the management terminal 400 is connected to only the migration-source storage A and used for a setting operation of the storage A. It should be noted that the management terminal 400 can be equally connected to the migration-destination storage B and used for a setting operation of the storage B. The management terminal 400 has a CPU, a memory, a storage apparatus, an input apparatus, a display apparatus and a storage interface (not shown). The storage apparatus is configured with, for example, a disk apparatus, magnetic optical disk, and so on. The management terminal 400 reads an operating system and an application program(s) stored in the storage apparatus and performs predetermined information processing. The input apparatus is configured with, for example, a keyboard, a mouse, and so on.

The management terminal 400 and the storage A are connected to each other via the Ethernet or can be connected to each other on a one-to-one basis via a cable. The management terminal 400 accepts an operation input of the manager via the input apparatus and displays an information processing result on the display apparatus. For example, the management terminal 400 has a program for storage migration management and is provided with a dedicated management screen through an execution of the program. An example of a management screen will be shown in FIGS. 5 and 6. Each management screen is generated by reading, in the management terminal 400, information of the logical unit management table 209 of the storage A and information of the logical unit management table 309 of the storage B. It should be noted that the information of the logical unit management table 309 of the migration-destination storage B can be read during a storage migration.

Figure 5:
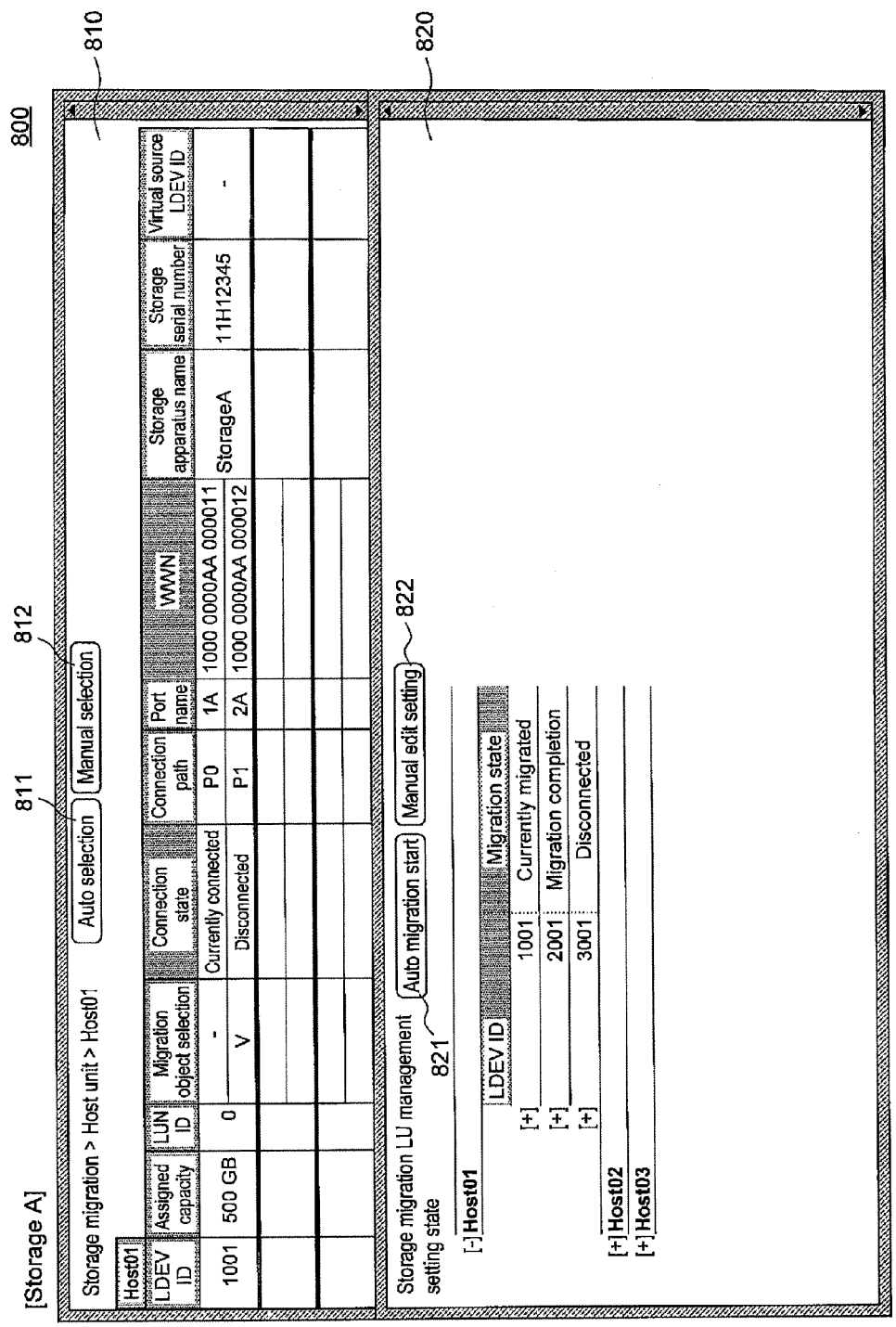
FIG. 5 is a view showing an example of a basic management screen.

FIG. 5 shows a basic screen used to select or manage a storage system migration unit (such as a host and a logical unit). A management screen 800 shown in FIG. 5 is provided with an operation screen 810 for selecting migration objectives in host units and an operation screen 820 for selecting logical units of the migration objectives collectively or individually.

The operation screen 810 is provided with an auto selection button 811 for automatically selecting a host in which a storage system is migrated, and a manual selection button 812 for individually selecting, by the manager, a host in which a storage system is migrated. In the operation screen 810, regarding individual logical devices, it is possible to check a selection state, a connection state with the host, and so on.

The operation screen 820 is provided with an auto migration start button 821 for automatically setting logical units of the migration objects and a manual edit setting button 822 for individually selecting logical units of the migration objects by the manager. It should be noted that the operation screen 820 is provided with an expansion button (or "+" button) for display content and a fold button (or "−" button) for the display content. By operating the expansion button (or "+" button), it is possible to check a designated item in detail. It should be noted that an operation screen 830 shown in FIG. 6 is displayed in a case where, in the operation screen 820, the expansion button (or "+" button) associated with a specific logical device is operated in a screen in which detailed information of logical devices assigned to the host is displayed. By preparing these management screens (including an operation screen), a storage migration operation depending on the manager's skill level is realized. Also, it is easily possible to find the process state of a storage migration operation.

[Configuration of Storage X]

The storage X is not necessarily an essential external storage. Therefore, there is an example (described later) where the storage X is not used. In an example in which the storage X is used, it is assumed that the storage X is used as an external storage of the storage A before a storage migration. As descried later, the storage X also has a function of connecting an external storage. After the storage migration, the storage X is disconnected from the storage A and managed as an external storage of the storage B. It should be noted that a virtualization function is arbitrarily provided in the storage X.

The storage X has main components of a storage controller 502, a cache memory 503, a cache control program 505, an actual logical unit 511 and an external storage connection interface 513.

Configurations of the storage controller 502, the cache memory 503 and the cache control program 505 are the same as those of the storage controller 202, the cache memory 203 and the cache control program 205 of the storage A.

The actual logical unit 511 denotes a logical unit set on a storage apparatus that physically exists in the storage X. A configuration of the external storage connection interface 513 is the same as the configuration of the external storage connection interface 213 of the storage A. In the case of FIG. 1, the external storage connection interface 513 is used for connection with the storage A before a storage migration and used for connection with the storage B after the storage migration.

EXAMPLE 1

In this example, a first storage migration processing method will be explained.

[Outline of Storage Migration Processing]

A computer system according to Example 1 has components of one host 100, the two storages A and B having a storage virtualization function, and the management terminal 400 connected to at least the migration-source storage A. That is, in the present example, a case is assumed where an external storage (i.e. the storage X) is not connected to the migration-source storage A.

Here, the number of the hosts 100 may be two or more and the number of storages related to migration may be three or more. Also, the management terminal 400 may be connected to a plurality of storages.

In the computer system according to Example 1, the host 100 needs not stop services during a storage migration. To realize this function, in the computer system according to Example 1, the following processing operations are entirely performed between the storages A and B.

First, the migration-source storage A applies a standby state to the writing of data for the cache memory 203 and then destages data existing in the cache memory 203 to the actual logical unit 211.

Next, the storage A directly writes data received from the host 100 via the path 0 (i.e. the first path), in the actual logical unit 211 by bypassing the cache memory 203. During the time, the migration-destination storage B sets setting information of the actual logical unit 211 into the management table of the virtual logical unit 311. Also, the storage B sets a writing mode for the cache memory 303 to the cache-bypass mode.

After that, the storage A blocks the path 0 (i.e. the first path) and opens the path 1 (i.e. the second path) set in advance between the storage B and the host 100. That is, a path switching is performed. Immediately after the path switching, if the storage B receives data through the path 1 (i.e. the second path), the storage B writes data received in the cache-bypass mode in the actual logical unit 211.

After the path switching, the storages A and B set the writing modes for the cache memories 203 and 303 to the cache use mode, respectively, and write data in the actual logical unit 211 via the cache memories 203 and 303.

[Detailed Image of Storage Migration Processing]

Figures 1, 7:
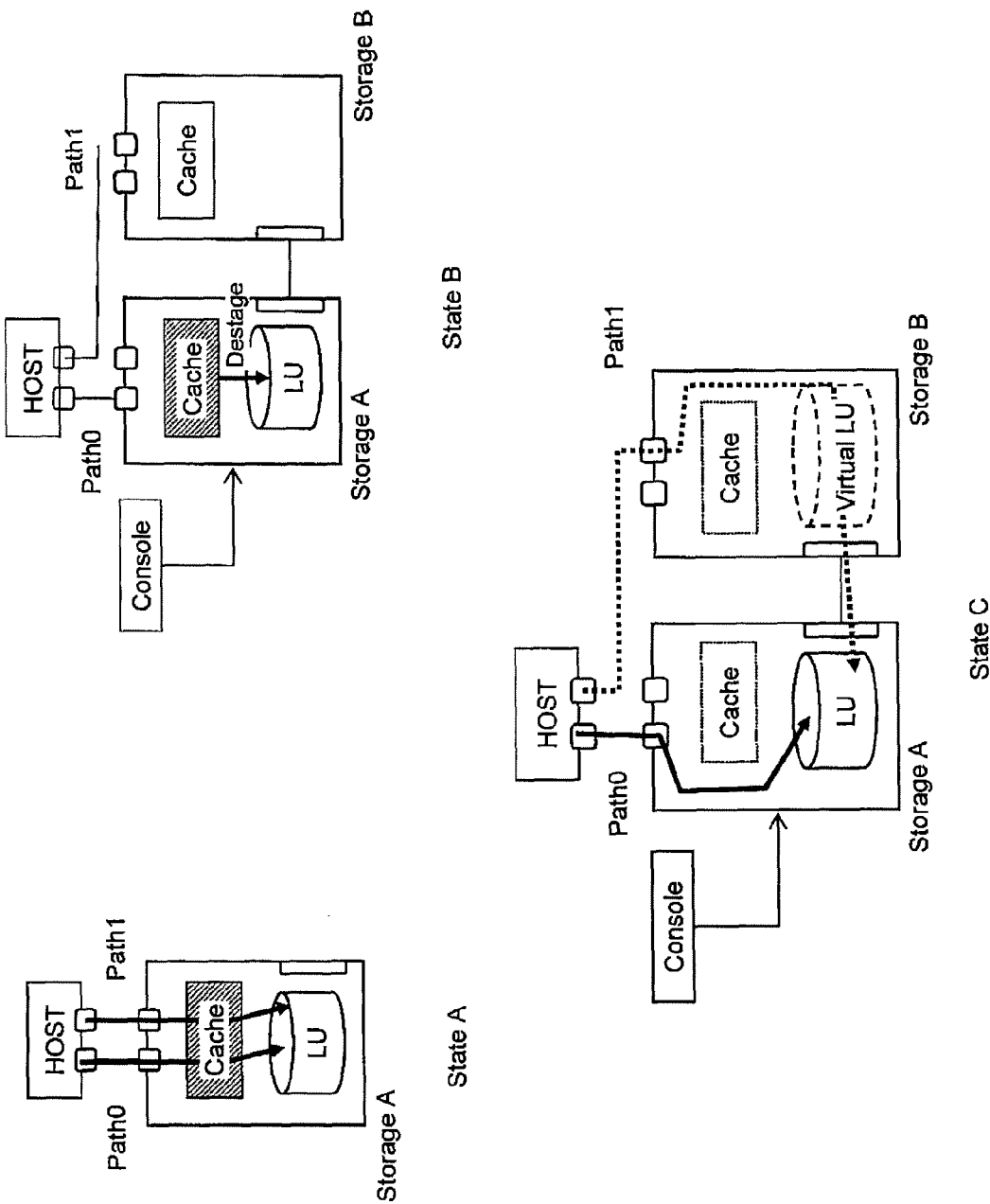
Figures 2, 7:
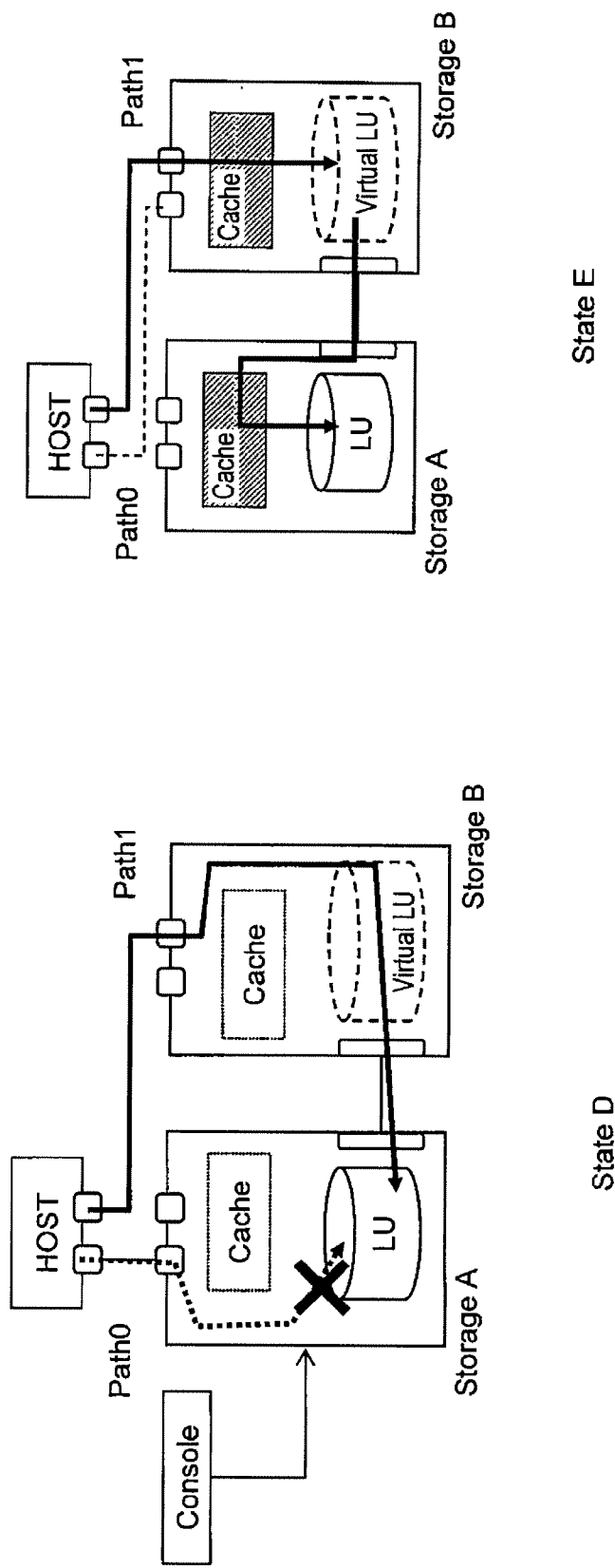

Detailed images of the above-noted processing operations will be explained using FIGS. 7-1 and 7-2. It should be noted that FIGS. 7-1 and 7-2 schematically show computer system configurations.

[State A: Initial State]

The state A shows an initial state of the migration-source storage A. This state corresponds to a state before a storage migration starts. In the state A, both the path 0 and the path 1 are physically and logically connected to the storage A. That is, the path 0 and the path 1 are both operated in an active state. Here, it is possible to operate the path 0 in an active state and the path 1 in a standby state.

In this case, I/O data issued from the host 100 to the paths 0 and 1 is temporarily stored in the cache memory 203 of the storage A and then destaged from the cache memory 203 to the actual logical unit 211.

[State B: Connection with Storage B and Migration Start Request]

In the state B, the manager physically disconnects the path 1 between the storage A and the host 100. Next, the manager physically connects the storages A and B. Then, a storage migration start request is reported from the management terminal 400 to the storage A. After that, the storage A applies a standby state to the writing of I/O in the cache memory 203 and decides whether or not I/O data remains in the cache memory 203. If I/O data remains in the cache memory 203, the storage A destages all I/O data in the cache memory 203 to the actual logical unit 211. It should be noted that, in the figure, a destage path of I/O data is represented by thick-line arrow.

[State C: Write-Continuation by Cache Bypass Mode]

In the state C, a mode of writing data for the cache memory 203 is switched to the cache-bypass mode. As a result of this, I/O data issued from the host 100 to the path 0 is controlled to a state where it is directly written in the actual logical unit 211. In the figure, a flow of I/O data in the cache-bypass mode is represented by thick-line arrow. During the time, the storage A sets the virtual logical unit 311 to the storage B through the external storage connection interfaces 213 and 313.

When the setting of the virtual logical unit 311 is completed, before starting communication with the host 100, the storage B switches a writing mode of data for the cache memory 303 to the cache-bypass mode. After that, the path 1 is physically connected between the storage B and the host 100. By this connection of the path 1, paths to access the actual logical unit 211 by the host 100 are multiplexed. However, in this stage, I/O data flows only via the path 0 and does not flow to the path 1. It should be noted that the setting of the cache-bypass mode may be performed before the setting of the virtual logical unit 311. In any event, unless the setting of the virtual logical unit 311 is completed, it is not possible to start writing I/O data in the actual logical unit 211 of the storage A via the virtual logical unit 311 in the cache-bypass mode.

[State D: Blocking of Path 0 and Opening of Path 1]

In the state D, the storage A blocks the path 0 and instructs the storage B to open the path 1. As a result, the storage A performs logical block processing of the path 0 and blocks an access to the actual logical unit 211 via the path 0.

On the other hand, the storage B logically connects the path 1 and controls the state such that it is possible to write I/O data in the actual logical unit 211 in the cache-bypass mode. At this time, the host 100 does not recognize the logical block or connection of paths on the storage side. Therefore, the host 100 that does not stop service provision transmits I/O data to the path 0 in the same way as the previous or past writing processing. However, at this time, the path 0 is logically blocked by the storage A. Therefore, the host 100 recognizes that an access to the actual logical unit 211 via the path 0 fails. In this case, path switching software of the host 100 recognizes the path 1 as an alternate path of the path 0. Therefore, the path switching software of the host 100 then tries to access the actual logical unit 211 via the path 1. At this time, the path 1 is already opened, so that the host 100 can continuously access the actual logical unit 211 via the path 1. After or before this path switching, the writing of I/O data is performed in the cache-bypass mode. That is, before or after the path switching, there is no data remaining in the cache memories 203 and 303. Therefore, before or after this path switching, the consistency of data on the actual logical unit 211 is maintained.

[State E: Migration Completion State]

The state E denotes a state where a storage migration is completed by path switching. In this state, the storages A and B set the writing modes for the cache memories 203 and 303 to the cache use mode, respectively. By this means, I/O data of the host 100 is written in the cache memory 303 of the storage B, written in the cache memory 203 of the storage A via the virtual logical unit 311 and then written in the actual logical unit 211.

It should be noted that communication of I/O data between the storages A and B is realized through the external storage connection interfaces 213 and 313. After the storage migration is completed, the path 0 is physically disconnected from the storage A. In the figure, the path 0 is set as a standby path of the storage B. However, it is equally possible to use the path 0 in an active state.

[Content of Storage Migration Processing Operation]

Next, processing content for realizing the above-described migration processing will be explained in view of software.

Figure 8:
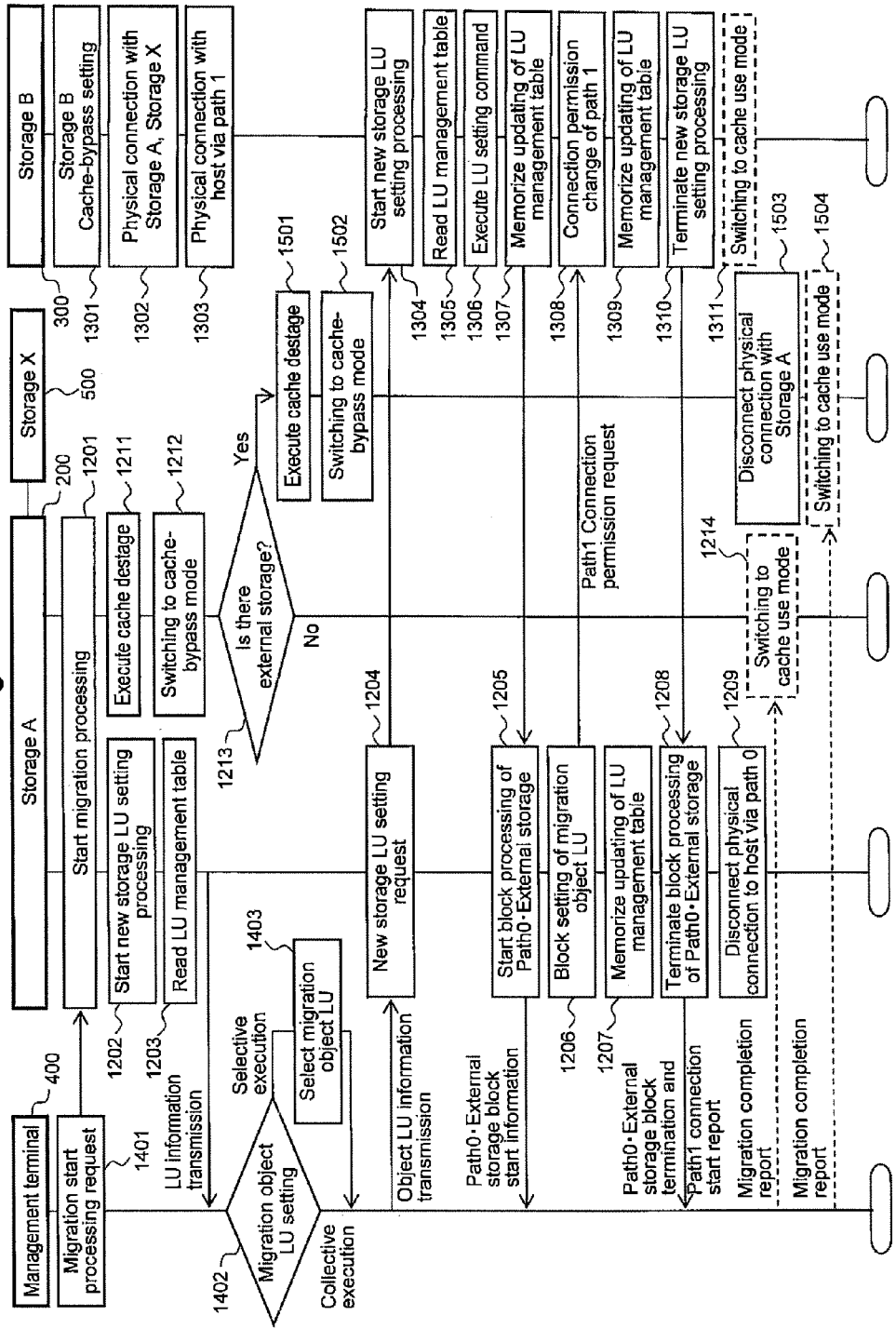
FIG. 8 is a flowchart which is used for explaining storage migration processing according to Example 1.

FIG. 8 shows processing content performed in, for example, a storage, for realizing the storage migration processing according to Example 1.

A migration operation originally starts at the management terminal 400. First, the management terminal 400 outputs a migration start processing request to the storage A (processing 1401). When receiving this request, the storage A starts migration processing (processing 1201). Next, the storage A activates processing of two types. One processing type denotes processing for requesting the logical unit setting to the migration-destination storage B and the other processing type denotes control processing for the cache memory 203.

First, when starting new-stage LU setting processing (processing 1202), the storage A (or the migration-destination storage logical unit setting program 208) reads information of the own logical unit management table 209 (processing 1203). The read information is transmitted from the storage A to the management terminal 400. At the same time, the storage A (or the cache control program 205) performs destage processing of the cache memory 203 (processing 1211). To be more specific, the storage A controls the writing of I/O data for the cache memory 203 to a standby state and then writes all I/O data existing in the cache memory 203, in the actual logical unit 211. It should be noted that, if there is no I/O data in the cache memory 203, this destage processing is skipped. Next, the storage A (or the cache control program 205) switches the writing mode for the cache memory 203 to the cache-bypass mode (processing 1212). After that, the storage A decides whether or not there is an external storage connected to the own storage (processing 1213). In the case of Example 1, since an external storage is not connected to the storage A, the storage A obtains a negative result and then the flow proceeds to next processing 1214. Here, processing 1214 is performed in a case where the completion of storage migration processing is reported from the management terminal 400. In processing 1214, the storage A (or the cache control program 205) switches the writing mode for the cache memory 203 to the cache use mode.

Together with these processes, the migration-destination storage B (or the cache control program 305) sets a writing mode for the cache memory 303 to the cache-bypass mode (processing 1301). Next, the storage B is connected to the storage A via the external storage connection interface 313 (processing 1302). This operation is performed by manager's manual operation. Also, the storage B is physically connected to the host 100 via the host interface 301 (processing 1303). This operation is also performed by manager's manual operation. It should be noted that the execution order of processing 1301 to processing 1303 is arbitrary.

A processing operation performed in the management terminal 400 will be explained again. The management terminal 400 having received the logical unit information from the storage A displays the management screen 800 (in FIG. 5) on a display apparatus and waits for manager's instruction of a selection mode of a migration object logical unit (processing 1402). Examples of the selection mode include a collective execution (i.e. auto execution) and an individual execution (i.e. selection execution). If the manager selects the individual execution, the management terminal 400 accepts selection of a logical unit of the migration object through the management screen 800 (processing 1403). In any event, if the logical unit of the migration object is determined, the management terminal 400 reports the information to the storages A and B.

When the storage A receives this report, the storage A starts processing of requesting the logical unit setting to a new storage (processing 1204). At the same time, the storage A transmits information of the logical unit selected as a destination object and the setting request to the storage B. The report from the storage A to the storage B is performed through the external storage connection interfaces 213 and 313.

When having received the migration-source logical unit information and the setting request, the storage B (or the logical unit management program 306) starts logical unit setting processing in the new storage (processing 1304). Next, the storage B (or the logical unit management program 306) reads the own logical unit management table 307 (processing 1305) and executes a logical unit setting command (processing 1306). Here, the storage B (or the logical unit management program 306) adds information of the logical unit migrated from the storage A, to the own logical unit management table 309, and stores it (processing 1307). By this means, information of the logical unit management table 309 of the storage B is updated. The updating completion of the logical unit management table 309 is reported from the storage B to the storage A.

When having received that report, the storage A starts block processing of the path 0 used by that storage (processing 1205). It should be noted that the start of the block processing is reported from the storage A to the management terminal 400. This report is used to update a connection state displayed on the management screen 800 in the management terminal 400. Next, the storage A (or the logical unit management program 206) sets the actual logical unit 211 of the migration object to a logically-blocked state (processing 1206) and then requests a connection permission of the path 1 to the storage B. After that, the storage A stores the connection state change in the logical unit management table 209 (processing 1207).

When having received this request, the storage B controls the path 1 in a logical connection state (processing 1308). It should be noted that, in the own logical unit management table 309, the storage B (or the logical unit management program 306) updates and stores connection information of the path 1 "during connection" (processing 1309). After that, the storage B terminates the logical unit setting processing in the new storage (processing 1310). The storage B reports this processing termination to the storage A and switches a writing mode for the cache memory 303 to the cache use mode (processing 1311). By the above processing, processing related to the storage migration in the storage B terminates.

On the other hand, when having received a termination report of the logical unit setting processing from the storage B, the storage A terminates the block processing of the path 0 (processing 1208). At this time, the connection state of the path 0 is turned to a "disconnection" state. After that, the storage A reports a block completion of the path 0 and a connection start of the path 1 to the management terminal. At this time, it is possible to physically disconnect the path 0. The manager having checked this state removes a cable used as the path 0 (processing 1209). By this means, one of two types of processes performed in the storage A terminates.

The processing operation performed in the management terminal 400 will be explained again. When having received the reports of the block completion of the path 0 and the connection start of the path 1 from the storage A, the management terminal 400 updates a connection state displayed on the management screen 800 based on that information. After that, the management terminal 400 instructs the storage A migrated as an external storage of the storage B, to use the cache memory 203 in the cache use mode. After that, the management terminal 400 terminates the storage migration processing.

On the other hand, the storage A switches a writing mode of the cache memory 203 to the cache use mode based on the instruction from the management terminal 400 (processing 1214). By this means, the remaining one processing performed in the storage A terminates.

It should be noted that, although FIG. 8 shows an operation in a case where an external storage is connected to the storage A, the operation content will be explained in Example 2.

[Host-Side Operation Before or after Storage Migration]

Figure 9:
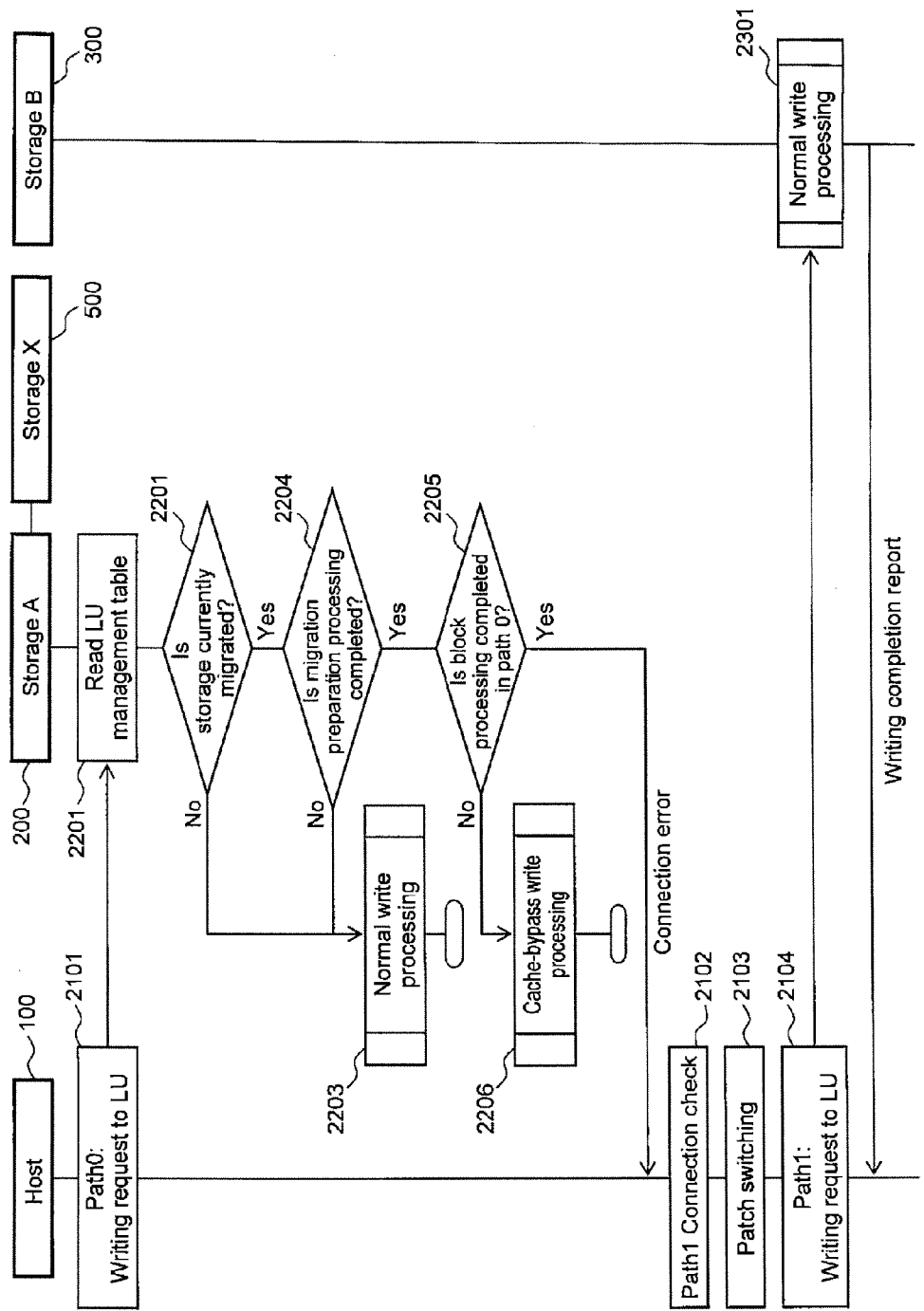
FIG. 9 is a flowchart which is used for explaining operations before or after storage migration processing according to Example 1.

Finally, an operation on the side of the host 100 before or after a storage migration will be explained using FIG. 9. It should be noted that, in an initial state, it is assumed that the host 100 and the storage A are physically and logically connected to the path 0. That is, it is assumed that storage migration processing is not started or storage migration processing is not completed.

First, the host 100 outputs a writing request for a logical unit, to the path 0 (processing 2101). This request is received in the storage A.

The storage A reads the logical unit management table 209 and checks the current state of a logical unit of the writing object (processing 2201). At this time, the storage A decides whether or not the logical unit of the writing object is in a storage migration state (processing 2202). If a negative result is obtained in processing 2202, the storage is not migrating, and therefore the storage A performs normal writing processing (processing 2203). After the writing is completed, the storage A reports the writing completion to the host 100.

By contrast, if a positive result is obtained in processing 2202, the storage A decides whether or not migration preparation processing is completed in the storage A (processing 2204). Here, the migration preparation processing completion means that destaging data remaining in the cache memory 203 to a logical unit is completed. Therefore, if a negative result is obtained in processing 2204, the storage A performs the normal writing processing (processing 2203). It should be noted that the writing processing in processing 2203 denotes the writing from the cache memory 203 to the logical unit 211 by destage.

By contrast, if a positive result is obtained in processing 2204, the storage A decides whether or not the path 0 has been logically blocked (processing 2205). As described in FIG. 8, the path 0 is logically blocked in a stage where a migration preparation of the migration-destination storage B is completed. Therefore, if a negative result is provided in processing 2205, the storage A performs writing processing of setting the writing mode for the cache memory 203 to the cache-bypass mode (processing 2206). This writing processing corresponds to the state C in FIG. 7-1. After the data writing is completed, the storage A reports the writing completion to the host 100.

If a positive result is obtained in processing 2205, the storage A reports a connection error to the host 100. Alternatively, the host 100 recognizes a writing failure from a fact that the writing completion report is not received from the storage A.

After that, the host 100 checks the connection of the path 1 (processing 2102). After the connection of the path 1 is checked, a path used for the writing in the logical unit is switched from the path 0 to the path 1 (processing 2103).

Next, the host 100 outputs a writing request for the logical unit to the path 1 (processing 2104). This request is received in the migration-destination storage B. After that, the storage B performs normal writing processing (processing 2301). This writing processing corresponds to the states D and E in FIG. 7-2. When the writing is completed, the storage B reports the writing completion to the host 100.

The above is the host operation performed before or after a storage migration. As shown in FIG. 9, the operation performed by the host 100 is only an operation of switching from the path 0 to the path 1 when detecting the writing failure, and the host 100 can continue the writing in the actual logical unit 211 regardless of provision of a storage migration.

TECHNICAL EFFECT OF EXAMPLE 1

As described above, the computer system according to Example 1 can perform a storage migration in a state where the host 100 continues provision of services (i.e. without stopping the provision of services).

Further, in the case of the computer system according to Example 1, the writing via the path 0 is performed in the cache-bypass mode immediately before the storage migration, and, after the writing is logically blocked, the writing via the path 1 is performed in the cache-bypass mode. Consequently, a case is not logically caused where, after the storage migration, the writing from the cache memory 203 to the actual logical unit 211 is performed and competes against the writing in the actual logical unit 211 via the path 1, so that it is possible to maintain the consistency of data before or after the storage migration.

Also, in the computer system according to Example 1, by individually or collectively designating logical units of the migration objects (e.g. a logical device) on the side of the migration-source storage A (i.e. on the side of a storage that is a "child" after a storage migration), it is possible to automatically set the setting information of the logical units of the migration objects to the logical unit management table 309 on the migration-destination storage B. By this means, it is possible to streamline the migration operation. Also, it is equally possible to check the progress state of the storage migration operation in the management screen, so that it is possible to enhance the maintenance efficiency.

Also, the storage migration processing in the computer system according to Example 1 is applicable even to a case where the paths 0 and 1 have an active/active relationship or active/standby relationship before the storage migration.

Also, in the computer system according to Example 1, it is possible to use a plurality of paths at the time of storage migration, so that it is possible to suppress the performance degradation and reduction due to I/O load, compared to a case where the path 0 used for connection with the storage A is blocked before the path 1 used for connection with the storage B is physically connected.

EXAMPLE 2

Ongoingly, the first storage migration processing method will be explained. However, in the case of the present example, it is assumed that the storage X is externally connected to the migration-source storage A and virtually managed. Therefore, the computer system according to Example 2 has components of one host 100, two storages A and B having a storage virtualization function, the management terminal 400 connected to at least the migration-source storage A, and the storage X that is externally connected to the storage A.

In Example 2, the number of the hosts 100 may be two or more and the number of storages related to migration may be three or more. Also, the management terminal 400 may be connected to a plurality of storages. Also, the number of the storages X may be two or more.

[Outline of Storage Migration Processing]

As described above, the computer system according to Example 2 performs a storage migration operation in the same processing method as in Example 1. However, in the computer system according to the present example, the storage X that is externally connected to the storage A is the migration object. Therefore, Example 2 differs from Example 1 in that processing of migrating the storage X to the storage B is added.

It is natural that the computer system according to the present example is common with that of Example 1 in that service provision by the host 100 is not stopped during a storage migration. To realize this function, in the computer system according to Example 2, the following processing operations are entirely performed between the storages A, B and X.

First, the migration-source storage A applies a standby state to the writing of data for the cache memories 203 and 503 and destages data existing in the cache memories 203 and 503 to the actual logical units 211 and 511 individually.

Next, the storage A directly writes data received via the path 0 (i.e. the first path), in the actual logical units 211 and 511 by bypassing the cache memories 203 and 503. During the time, the migration-destination storage B sets the setting information of the actual logical units 211 and 511 into the management tables of the logical units 311 and 312, respectively. Also, the storage B sets a writing mode for the cache memory 303 to the cache-bypass mode.

After that, the storage A blocks the path 0 (i.e. the first path) and opens the path 1 (i.e. the second path) set in advance between the storage B and the host 100. That is, a path switching is performed. Immediately after the path switching, if the storage B receives data through the path 1 (i.e. the second path), the storage B writes data received in the cache-bypass mode in the actual logical units 211 and 511.

After the path switching, the storages A and B set the writing modes for the cache memories 203, 303 and 503 to the cache use mode, respectively, and write data in the actual logical units 211 and 511 via the cache memories 203, 303 and 503.

[Detailed Image of Storage Migration Processing]

Detailed images of the above-noted processing operations will be explained using FIGS. 10-1 to 10-4. It should be noted that FIGS. 10-1 to 10-4 schematically show computer system configurations.

[State A: Initial State]

The state A shows the initial states of the migration-source storages A and X. These states correspond to states before a storage migration starts. In the state A, both the path 0 and the path 1 are physically and logically connected to the storage A (and virtually connected to the storage X). It should be noted that the path 0 is operated in an active state and the path 1 is operated in a standby state.

In this case, I/O data issued from the host 100 to the path 0 is temporarily stored in the cache memory 203 of the storage A. Here, I/O data for the actual logical unit 211 of the storage A as an access destination is destaged from the cache memory 203 to the actual logical unit 211. On the other hand, I/O data for the actual logical unit 511 of the storage X as an access destination is destaged from the cache memory 203 and temporarily stored in the cache memory 503. Further, the I/O data is destaged from the cache memory 503 to the actual logical unit 511. Access from the storage A to the storage X is performed through the external storage connection interfaces 213 and 513.

[State B: Connection with Storage B and Migration Start Request]

In the state B, the migration-destination storage B is physically connected to the migration-source storage A. Then, a storage migration start request is reported from the management terminal 400 to the storage A. After that, the storage A applies a standby state to the writing of I/O in the cache memory 203 and decides whether or not I/O data remains in the cache memory 203. If I/O data remains in the cache memory 203, the storage A destages all I/O data in the cache memory 203. At this time, I/O data for the actual logical unit 211 as an access destination is destaged to the actual logical unit 211. On the other hand, I/O data for the actual logical unit 511 as an access destination is destaged to the cache memory 503 and then destaged from the cache memory 503 to the actual logical unit 511. It should be noted that, in FIG. 10, a destage path of I/O data is represented by thick-line arrow.

[State C: Write Continuation by Cache Bypass Mode]

In the state C, a mode of writing data for the cache memories 203 and 503 is switched to the cache-bypass mode. As a result of this, I/O data issued from the host 100 to the path 0 is controlled to a state where it is directly written in the actual logical unit 211 and directly written in the actual logical unit 511 via the virtual logical unit 212. In FIG. 10-2, the writing path of I/O data in the cache-bypass mode is represented by thick-line arrow. During the time, the storage A sets the virtual logical units 311 and 312 to the storage B through the external storage connection interfaces 213 and 313. The virtual logical unit 311 denotes a virtual logical unit supporting the actual logical unit 211 of the storage A and the virtual logical unit 312 denotes a virtual logical unit supporting the actual logical unit 511 of the storage X.

When the settings of the virtual logical units 311 and 312 are completed, before starting communication with the host 100, the storage B switches a writing mode of data for the cache memory 303 to the cache-bypass mode. After that, the path 1 is physically connected between the storage B and the host 100. By this connection of the path 1, paths to access the actual logical units 211 and 511 by the host 100 are multiplexed. However, in this stage, I/O data flows only via the path 0 and does not flow to the path 1. It should be noted that the setting of the cache-bypass mode may be performed before the settings of the virtual logical units 311 and 312. In any event, unless the settings of the virtual logical units 311 and 312 are completed, it is not possible to start writing I/O data in the actual logical unit 211 of the storage A via the virtual logical unit 311 and writing I/O data in the actual logical unit 511 of the storage X via the virtual logical unit 312, in the cache-bypass mode.

[State D: Blocking of Path 0 and Opening of Path 1]

In the state D, the storage A blocks the path 0 and instructs the storage B to open the path 1. As a result, the storage A performs logical block processing of the path 0 and blocks an access to the actual logical units 211 and 511 via the path 0.

On the other hand, the storage B logically connects the path 1 and controls the state such that it is possible to write I/O data in the actual logical units 211 and 511 in the cache-bypass mode. At this time, the host 100 does not recognize the block or connection of paths on the storage side. Therefore, the host 100 that does not stop service provision transmits I/O data to the path 0 in the same way as the previous or past writing processing. However, at this time, the path 0 is logically blocked by the storage A. Therefore, the host 100 recognizes that an access to the actual logical units 211 and 511 via the path 0 fails. In this case, path switching software of the host 100 recognizes the path 1 as an alternate path of the path 0. Therefore, the path switching software of the host 100 then tries to access the actual logical units 211 and 511 via the path 1. At this time, the path 1 is already opened, so that the host 100 can continuously access the actual logical units 211 and 511 via the path 1. After or before this path switching, the writing of I/O data is performed in the cache-bypass mode. That is, before or after the path switching, there is no data remaining in the cache memories 203 and 303. Therefore, before or after this path switching, the consistency of data on the actual logical units 211 and 511 is maintained.

[State E: Migration Completion State]

The state E denotes a state where a storage migration is completed by path switching. In this state, the storages A, B and X set the writing modes for the cache memories 203, 303 and 503 to the cache use mode, respectively. By this means, I/O data of the host 100 is written in the cache memory 303 of the storage B and then destaged depending on the access destination. For example, I/O data for the actual logical unit 211 of the storage A is written in the cache memory 203 via the virtual logical unit 311 and then written in the actual logical unit 211. For example, I/O data for the actual logical unit 511 of the storage X is written in the cache memory 503 via the virtual logical unit 312 and then written in the actual logical unit 511.

It should be noted that communication of I/O data between the storages A and B is realized through the external storage connection interfaces 213 and 313, and communication of I/O data between the storages B and X is realized through the external storage connection interfaces 313 and 513. After the storage migration is completed, the path 0 is physically disconnected from the storage A. In the figure, although the path 0 is set as a standby path of the storage B, its use method is arbitrary.

[Content of Storage Migration Processing Operation]

Next, migration processing content according to Example 2 will be explained in view of differences from Example 1. Therefore, in the present example, FIG. 8 is also used for explanation. In the following, differences will be explained for each of components forming the computer system.

In the processing operations of the storage A, the processing content in processing 1205 and processing 1208 differs from that in Example 1. In processing 1205 and processing 1208, a different point from Example 1 is that the block object is the path 0 connecting between the host 100 and the storage A and is the connection established between the storage A and the storage X.

In the processing operations of the storage B, there is a difference from Example 1 in that the connection objects by the external storage connection interface 313 in processing 1302 include the storage X. Also, there is a difference from Example 1 in that the management objects of the logical unit management table 309 include the actual logical unit 311 of the storage X.

The processing operations of the management terminal 400 differ from those of Example 1 in that logical units of the migration objects include the logical unit of the storage X which is an external storage. Also, there is a difference in that, after connection of the path 1 is checked, the management terminal 400 transmits an instruction to the storage X migrated to an external storage of the storage B, such that the writing mode for the cache memory 503 is changed to the cache use mode.

Processes 1501 to 1504 in the storage X are new processing operations in the present example. First, processing 1501 is performed in a case where a positive result is obtained in processing 1213 in storage A. In processing 1501, I/O data of the cache memory 503 is destaged before a storage migration starts. In processing 1502, after the cache destage is completed, processing of switching the writing mode for the cache memory 503 to the cache-bypass mode is performed. Also, in processing 1503, processing of disconnecting the physical connection between the storage A and the storage X is performed. In processing 1504, based on the instruction from the management terminal 400, processing of switching the writing mode for the cache memory 503 of the storage X to the cache use mode is performed.

The processing operation differences between Example 2 and Example 1 have been described above. It should be noted that the host operation performed before or after a storage migration is the same as in Example 1.

TECHNICAL EFFECT OF EXAMPLE 2

As described above, the computer system according to Example 2 is the same as in Example 1, except for that processing of migrating to the storage B is performed even for the storage X that is externally connected to the storage A. Therefore, in the computer system according to Example 2, it is equally possible to realize the same effect as in Example 1.

EXAMPLE 3

In this example, a second storage migration processing method will be explained. The computer system according to Example 3 has the same system configuration as in Example 1. That is, the computer system according to Example 3 has components of one host 100, the two storages A and B having a storage virtualization function, and the management terminal 400 connected to at least the migration-source storage A, where an external storage (i.e. the storage X) is not connected to the storage A. It is natural that the number of the hosts 100 may be two or more and the number of storages related to migration may be three or more. Also, the management terminal 400 may be connected to a plurality of storages.

[Outline of Storage Migration Processing]

The computer system according to Example 3 is common with Examples 1 and 2 in that service provision by the host 100 is not stopped during a storage migration. To realize this function, in the computer system according to Example 3, the following processing operations are entirely performed between the storages A and B.

First, the migration-source storage A applies a standby state to the writing of data for the cache memory 203 and then destages data existing in the cache memory 203 to the actual logical unit 211.

Next, the storage A directly writes data received from the host 100 via the path 0 (i.e. the first path), in the actual logical unit 211 by bypassing the cache memory 203. During the time, the migration-destination storage B sets setting information of the actual logical unit 211 into the management table of the virtual logical unit 311. Also, the migration-destination storage B logically sets the path 1 (i.e. the second path) used for connection with the host 100. It is natural that it is physically connected, and therefore it is not possible to actually use the path 1 (i.e. the second path).

After that, the storage A blocks the path 0 (i.e. the first path). On the other hand, the storage B opens the path 1 (i.e. the second path) after the path 1 (i.e. the second path) is physically connected to the host 100. That is, the path switching is performed. It should be noted that, in the case of this example, the cache use mode is set to the storage B.

After this path switching, the storage B directly writes data received via the path 1 (i.e. the second path), in the actual logical unit 211 of the storage A via the cache memory 303.

After this writing, the storage A sets a writing mode for the cache memory 203 to the cache use mode and writes data in the actual logical unit 211 via the cache memories 203 and 303.

[Detailed Image of Storage Migration Processing]

Figures 1, 11:
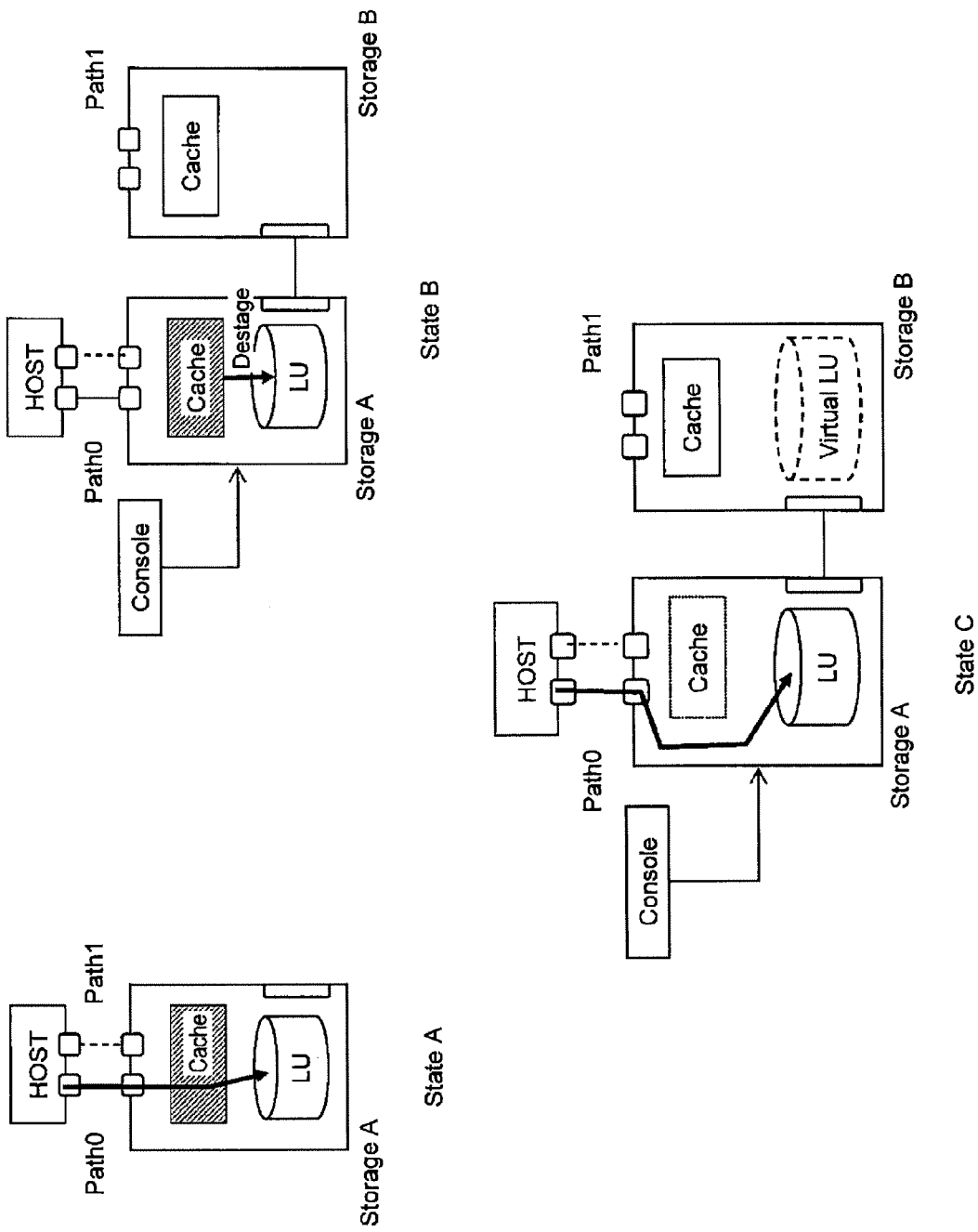
Figures 2, 11:
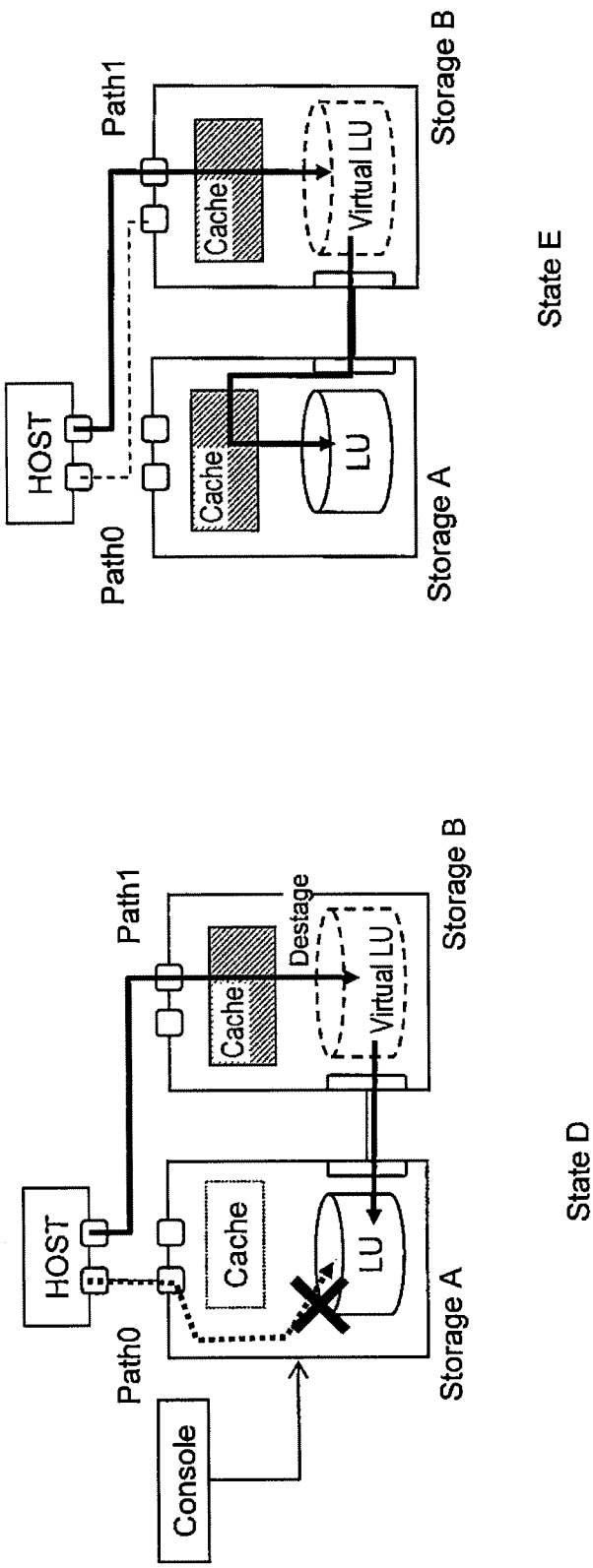

Detailed images of the above-noted processing operations will be explained using FIGS. 11-1 and 11-2. It should be noted that FIGS. 11-1 and 11-2 schematically show computer system configurations.

[State A: Initial State]

The state A shows an initial state of the migration-source storage A. This state corresponds to a state before a storage migration starts. In the state A, both the path 0 and the path 1 are physically connected to the storage A. However, the path 0 is operated in an active state and the path 1 is operated in a standby state. Here, both the path 0 and the path 1 may be operated in an active state.

In this case, I/O data issued from the host 100 to the path 0 is temporarily stored in the cache memory 203 of the storage A and then destaged from the cache memory 203 to the actual logical unit 211.

[State B: Connection with Storage B and Migration Start Request]

In the state B, the manager physically connects the storage A and the storage B. Then, a storage migration start request is reported from the management terminal 400 to the storage A. After that, the storage A applies a standby state to the writing of I/O in the cache memory 203 and decides whether or not I/O data remains in the cache memory 203. If I/O data remains in the cache memory 203, the storage A destages all I/O data in the cache memory 203 to the actual logical unit 211. It should be noted that, in the figure, a destage path of I/O data is represented by thick-line arrow.

[State C: Write Continuation by Cache Bypass Mode]

In the state C, a mode of writing data for the cache memory 203 is switched to the cache-bypass mode. As a result of this, I/O data issued from the host 100 to the path 0 is controlled to a state where it is directly written in the actual logical unit 211. In the figure, a flow of I/O data in the cache-bypass mode is represented by thick-line arrow. During the time, the storage A sets the virtual logical unit 311 to the storage B through the external storage connection interfaces 213 and 313.

When the setting of the virtual logical unit 311 is completed, before starting communication with the host 100, the storage B sets a writing mode of data for the cache memory 303 to the cache use mode. It should be noted that, in this stage, there is no physical connection by the path 1 between the storage B and the host 100. Therefore, the above-described setting of the virtual logical unit 311 denotes the setting on logical management. Here, by this setting, administratively, a state is provided where the path 1 is available.

[State D: Blocking of Path 0 and Opening of Path 1]

In the state D, the storage A blocks the path 0. The block of the path 0 is logically performed. By blocking the path 0, access to the actual logical unit 211 via the path 0 is blocked. On the other hand, the storage B opens the path 1 after the path 1 and the host 100 are physically connected. The physical connection of the path 1 is performed by the manager. The manager physically connects the path 1 after checking the block of the path 0 in the management screen 800 of the management terminal 400. As described above, the logical setting for the path 1 has been completed. Therefore, physical connection and communication through the path 1 are simultaneously possible. However, if the path 1 is physically connected before the path 0 is logically blocked, the writing in the actual logical unit 211 via the path 0 and the writing in the actual logical unit 211 via the path 1 are competitive. Therefore, as described in the present example, the path 1 is physically connected after the path 0 is logically blocked. It should be noted that a writing mode for the cache memory 303 in the storage B is set to the cache use mode. Therefore, data received via the path 1 is written in the cache memory 303 and then destaged in the virtual logical unit 311.

On the other hand, the host 100 does not recognize the logical block of the path 0 or the connection of the path 1 on the storage side. Therefore, the host 100 that does not stop service provision transmits I/O data to the path 0 in the same way as the previous or past writing processing. However, at this time, the path 0 is logically blocked by the storage A. Therefore, the host 100 recognizes that an access to the actual logical unit 211 via the path 0 fails. In this case, path switching software of the host 100 recognizes the path 1 as an alternate path of the path 0. Therefore, the path switching software of the host 100 then tries to access the actual logical unit 211 via the path 1. At this time, if the path 1 is already opened, the host 100 can continuously access the actual logical unit 211 via the path 1.

Here, immediately before the path switching, the writing of I/O data in the storage A via the path 0 is performed in the cache-bypass mode. Therefore, after this path switching, there is no I/O data destaged from the cache memories 203 and 503 to the actual logical units 211 and 511. Therefore, a case is not caused where, even after it is switched to the writing of I/O data via the path 1, the writings of data on the actual logical units 211 and 511 are competitive, so that the consistency of data is maintained.

[State E: Migration Completion State]

The state E denotes a state where a storage migration is completed by path switching. In this state, the storage A sets a writing mode for the cache memory 203 to the cache use mode. By this means, I/O data of the host 100 is written in the cache memory 303 of the storage B, written in the cache memory 203 of the storage A via the virtual logical unit 311 and then written in the actual logical unit 211.

It should be noted that communication of I/O data between the storages A and B is realized through the external storage connection interfaces 213 and 313. After the storage migration is completed, the path 0 is physically disconnected from the storage A. In the figure, the path 0 is set as a standby path of the storage B. However, it is equally possible to use the path 0 in an active state.

[Content of Storage Migration Processing Operation]

Figure 12:
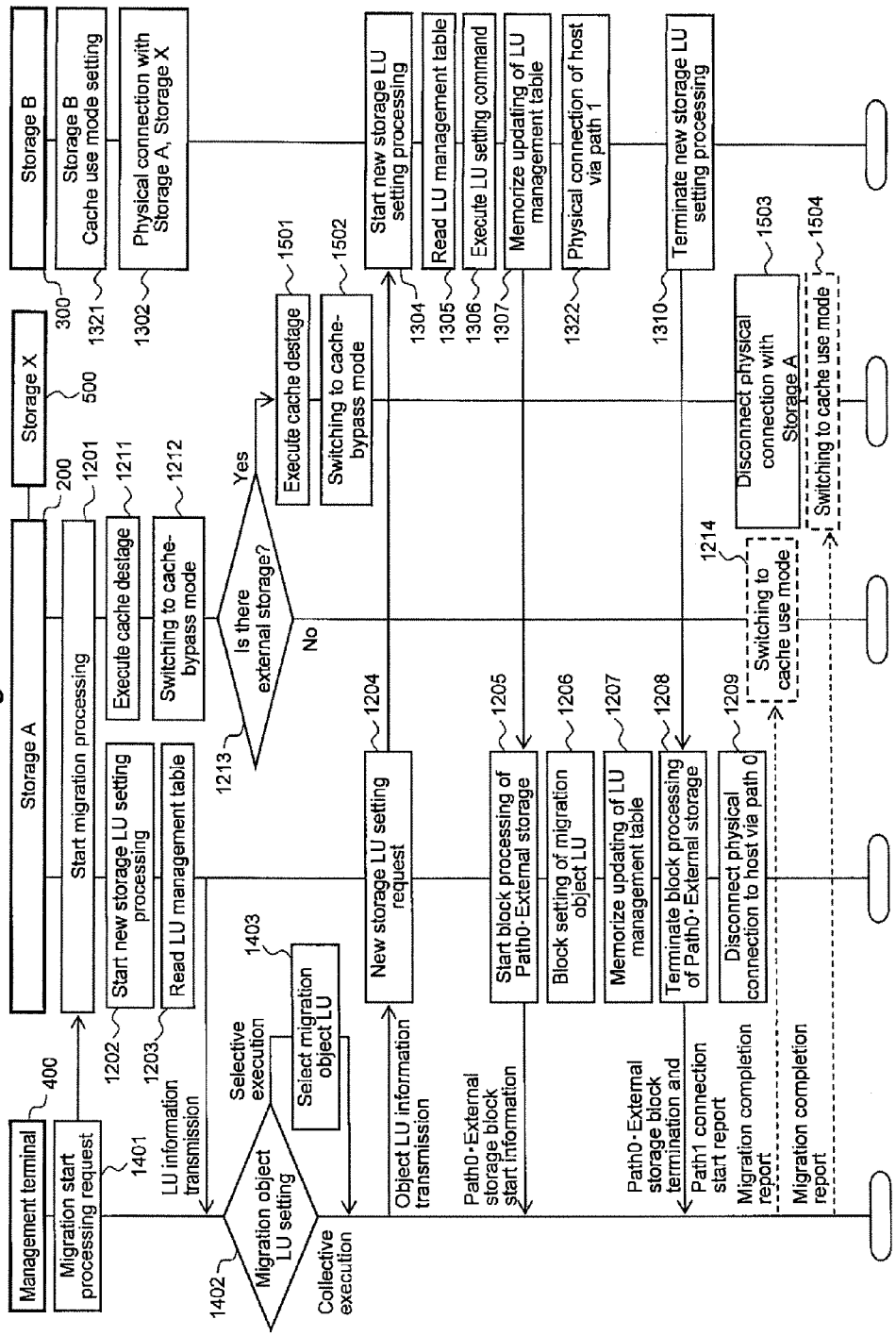
FIG. 12 is a flowchart which is used for explaining storage migration processing according to Example 3.

Next, processing content for realizing the above-described migration processing will be explained in view of software. FIG. 12 shows processing content performed in, for example, a storage, for realizing the storage migration processing according to Example 3.

A migration operation originally starts at the management terminal 400. First, the management terminal 400 outputs a migration start processing request to the storage A (processing 1401). When receiving this request, the storage A starts migration processing (processing 1201). Next, the storage A activates processing of two types. One processing type denotes processing for requesting the logical unit setting to the migration-destination storage B and the other processing type denotes control processing for the cache memory 203.

First, when starting new-stage LU setting processing (processing 1202), the storage A (or the migration-destination storage logical unit setting program 208) reads information of the own logical unit management table 209 (processing 1203). The read information is transmitted from the storage A to the management terminal 400. At the same time, the storage A (or the cache control program 205) performs destage processing of the cache memory 203 (processing 1211). To be more specific, the storage A controls the writing of I/O data for the cache memory 203 to a standby state and then writes all I/O data existing in the cache memory 203, in the actual logical unit 211. It should be noted that, if there is no I/O data in the cache memory 203, this destage processing is skipped. Next, the storage A (or the cache control program 205) switches the writing mode for the cache memory 203 to the cache-bypass mode (processing 1212). After that, the storage A decides whether or not there is an external storage connected to the own storage (processing 1213). In the case of Example 3, since an external storage is not connected to the storage A, the storage A obtains a negative result and then the flow proceeds to next processing 1214. Here, processing 1214 is performed in a case where the completion of storage migration processing is reported from the management terminal 400. In processing 1214, the storage A (or the cache control program 205) switches the writing mode for the cache memory 203 to the cache use mode.

Together with these processes, the migration-destination storage B (or the cache control program 305) sets a writing mode for the cache memory 303 to the cache use mode (processing 1321). This setting operation is a difference from Example 1.

Next, the storage B is connected to the storage A via the external storage connection interface 313 (processing 1302). This operation is performed by manager's manual operation. It should be noted that, in Example 3, the logical setting is performed before the path 1 is physically connected, and therefore the path 1 is not connected in this stage.

A processing operation performed in the management terminal 400 will be explained again. The management terminal 400 having received the logical unit information from the storage A displays the management screen 800 (in FIG. 5) on a display apparatus and waits for manager's instruction of a selection mode of a migration object logical unit (processing 1402). Examples of the selection mode include a collective execution (i.e. auto execution) and an individual execution (i.e. selection execution). If the manager selects the individual execution, the management terminal 400 accepts selection of a logical unit of the migration object through the management screen 800 (processing 1403). In any event, if the logical unit of the migration object is determined, the management terminal 400 reports the information to the storages A and B.

When the storage A receives this report, the storage A starts processing of requesting the logical unit setting to a new storage (processing 1204). Here, the storage A transmits information of the logical unit selected as a migration object and the setting request to the storage B. The report from the storage A to the storage B is performed through the external storage connection interfaces 213 and 313.

When having received the migration-source logical unit information and the setting request, the storage B (or the logical unit management program 306) starts logical unit setting processing in the new storage (processing 1304). Next, the storage B (or the logical unit management program 306) reads the own logical unit management table 307 (processing 1305) and executes a logical unit setting command (processing 1306). Here, the storage B (or the logical unit management program 306) adds information of the logical unit migrated from the storage A, to the own logical unit management table 309, and stores it (processing 1307). By this means, information of the logical unit management table 309 of the storage B is updated. The updating completion of the logical unit management table 309 is reported from the storage B to the storage A.

After that, when the path 1 is physically connected to the host 100 (processing 1322), the storage B terminates the logical unit setting processing in the new storage and reports the processing termination to the storage A (processing 1310). Here, physical connection of the path 1 is performed by the manager. As described above, the physical connection of the path 1 is performed after the path 0 is blocked. Processing related to a storage migration in the storage B has been terminated as above.

On the other hand, when the updating of the logical unit management table 309 is reported from the storage B, the storage A starts block processing of the path 0 used by that storage (processing 1205). It should be noted that the start of the block processing is reported from the storage A to the management terminal 400. This report is used to update a connection state displayed on the management screen 800 in the management terminal 400. Next, the storage A (or the logical unit management program 206) sets the actual logical unit 211 of the migration object to a logically-blocked state (processing 1206), and then stores the connection state change in the logical unit management table 209 (processing 1207).

Further, when having received a termination report of the storage migration processing from the storage B, the storage A terminates the block processing of the path 0 (processing 1208). At this time, the connection state of the path 0 is turned to a "disconnection" state. After that, the storage A reports a block completion of the path 0 and a connection start of the path 1 to the management terminal. At this time, it is possible to physically disconnect the path 0. The manager having checked this state removes a cable used as the path 0 (processing 1209). By this means, one of two types of processes performed in the storage A terminates.

The processing operation performed in the management terminal 400 will be explained again. When having received the reports of the bock completion of the path 0 and the connection start of the path 1 from, the storage A, the management terminal 400 updates a connection state displayed on the management screen 800 based on that information. After that, the management table 400 instructs the storage A migrated as an external storage of the storage B, to use the cache memory 203 in the cache use mode. After that, the management terminal 400 terminates the storage migration processing.

On the other hand, the storage A switches a writing mode of the cache memory 203 to the cache use mode based on the instruction from the management terminal 400 (processing 1214). By this means, the remaining one processing performed in the storage A terminates.

It should be noted that, although FIG. 12 shows an operation in a case where an external storage is connected to the storage A, the operation content will be explained in Example 4.

[Host-Side Operation Before or after Storage Migration]

Finally, an operation on the side of a host before or after a storage migration is the same as in Example 1. As described above, the operation performed by the host 100 is only an operation of switching from the path 0 to the path 1 when detecting the writing failure, and the host 100 can continue the writing in the actual logical unit 211 regardless of provision of a storage migration.

TECHNICAL EFFECT OF EXAMPLE 3

As described above, the computer system according to Example 3 can perform a storage migration in a state where the host 100 continues provision of services (i.e. without stopping the provision of services).

Further, in the case of the computer system according to Example 3, the writing via the path 0 is performed in the cache-bypass mode immediately before the storage migration, and, after the writing is logically blocked, the writing via the path 1 is performed. Consequently, a case is not logically caused where, after the storage migration, the writing from the cache memory 203 to the actual logical unit 211 is performed and competes against the writing in the actual logical unit 211 via the path 1, so that it is possible to maintain the consistency of data before or after the storage migration.

Also, in the computer system according to Example 3, by individually or collectively designating logical units of the migration objects (e.g. a logical device) on the side of the migration-source storage A (i.e. on the side of a storage that is a "child" after a storage migration), it is possible to automatically set the setting information of the logical units of the migration objects to the logical unit management table 309 on the migration-destination storage B. By this means, it is possible to streamline the migration operation. Also, it is equally possible to check the progress state of the storage migration operation in the management screen, so that it is possible to enhance the maintenance efficiency.

Also, the storage migration processing in the computer system according to Example 3 is applicable even to a case where the paths 0 and 1 have an active/active relationship or active/standby relationship before the storage switching.

Also, in the computer system according to Example 3, the path 1 is physically connected (and has been logically connected) after the path 0 is disconnected. That is, there is always one path in a state of physically connecting to the host 100. Therefore, compared to a case where there are a plurality of paths that are physically connected to the host 100, it is possible to migrate a storage more safely.

Also, in the computer system according to Example 3, a storage migration is possible by physical connection of the path 1, so that the storage migration is easily checked.

EXAMPLE 4

Ongoingly, the second storage migration processing method will be explained. The relationship of the present example with respect to Example 3 is the same as the relationship of Example 2 with respect to Example 1. Therefore, in the case of the present example, it is assumed that the storage X is externally connected to the migration-source storage A and virtually managed. That is, the computer system according to Example 4 has components of one host 100, two storages A and B having a storage virtualization function, the management terminal 400 connected to at least the migration-source storage A, and the storage X having a virtualization function of a storage that is externally connected to the storage A.

In Example 4, the number of the hosts 100 may be two or more and the number of storages related to migration may be three or more. Also, the management terminal 400 may be connected to a plurality of storages. Also, the number of the storages X may be two or more.

[Outline of Storage Migration Processing]

The computer system according to Example 4 has components of one host 100, two storages A and B having a storage virtualization function, the management terminal 400 connected to at least the migration-source storage A, and the storage X having a virtualization function of a storage that is externally connected to the storage A.

In the same way as in Example 3, the number of the hosts 100 may be two or more and the number of storages related to migration may be three or more. Also, the management terminal 400 may be connected to a plurality of storages. Also, the number of the storages X may be two or more.

It should be noted that the computer system according to Example 4 performs storage migration operations in basically the same procedure as in Example 3. However, in the case of Example 4, the storage X is externally connected to the storage A, and therefore the storage X also needs to be migrated to the storage B.

It is natural that, in the computer system according to the present example, the host 100 needs not stop service provision during a storage migration. To realize this function, in the computer system according to Example 4, the following processing operations are entirely performed between the storages A, B and X.

First, the migration-source storage A applies a standby state to the writing of data for the cache memories 203 and 503 and destages data existing in the cache memories 203 and 503 to the actual logical units 211 and 511 individually.

Next, the storage A directly writes data received from the host 100 via the path 0 (i.e. the first path), in the actual logical units 211 and 511 by bypassing the cache memories 203 and 503. During the time, the migration-destination storage B sets the setting information of the actual logical units 211 and 511 into the management tables of the virtual logical units 311 and 312, respectively.

After that, the storage A blocks the path 0 (i.e. the first path). On the other hand, the storage B opens the path 1 (i.e. the second path) after the path 1 is physically connected to the host 100. That is, the path switching is performed. It should be noted that, in the case of this example, the cache use mode is equally set to the storage B.

After this path switching, the storage B directly writes data received via the path 1 (i.e. the second path), in the actual logical unit 211 of the storage A and the actual logical unit 511 of the storage X via the cache memory 303.

After this writing, the storage A sets a writing mode for the cache memory 203 to the cache use mode and writes data in the actual logical unit 211 via the cache memories 203 and 303. Also, the storage X sets a writing mode for the cache memory 503 to the cache use mode and writes data in the actual logical unit 511 via the cache memories 203 and 303.

[Detailed Image of Storage Migration Processing]

Figures 1, 13:
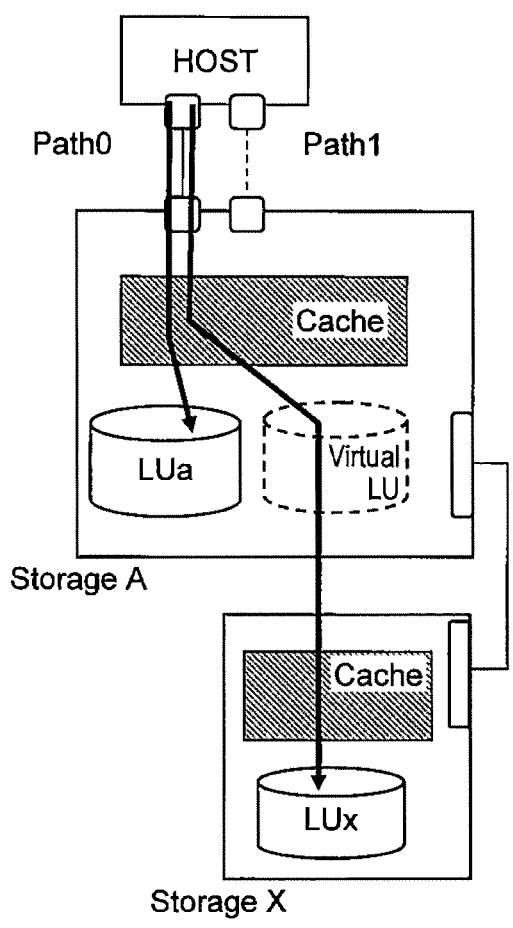
Figures 2, 13:
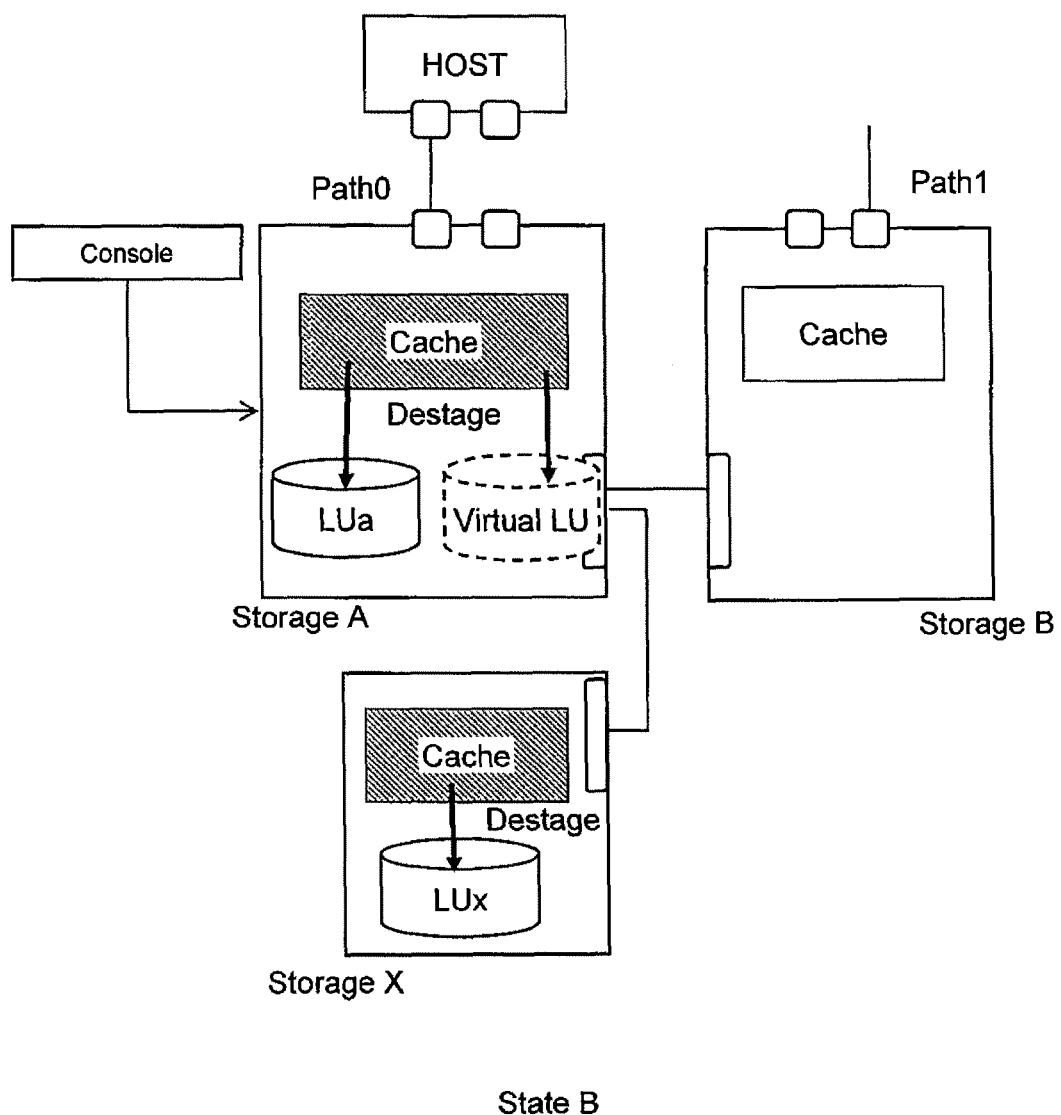
Figures 3, 13:
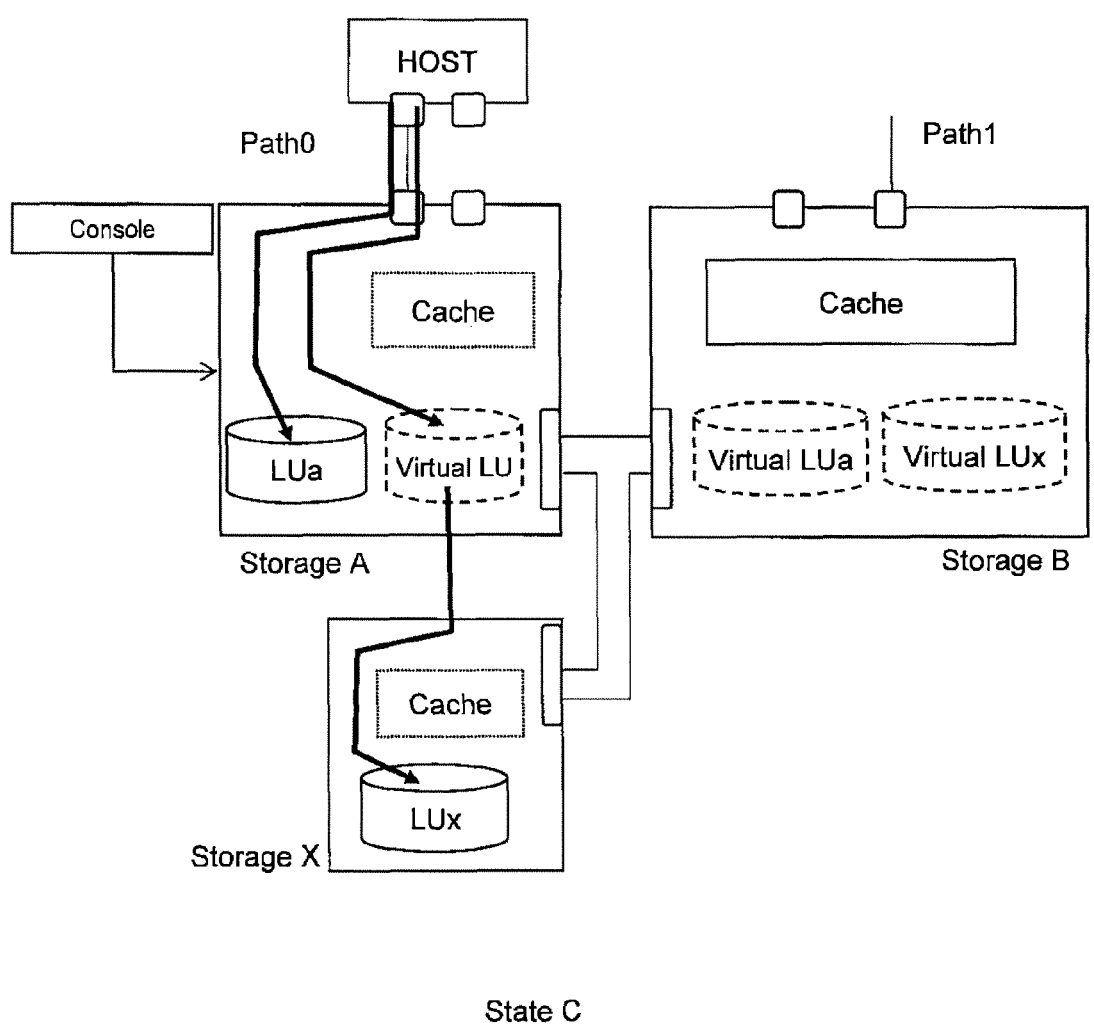
Figures 4, 13:
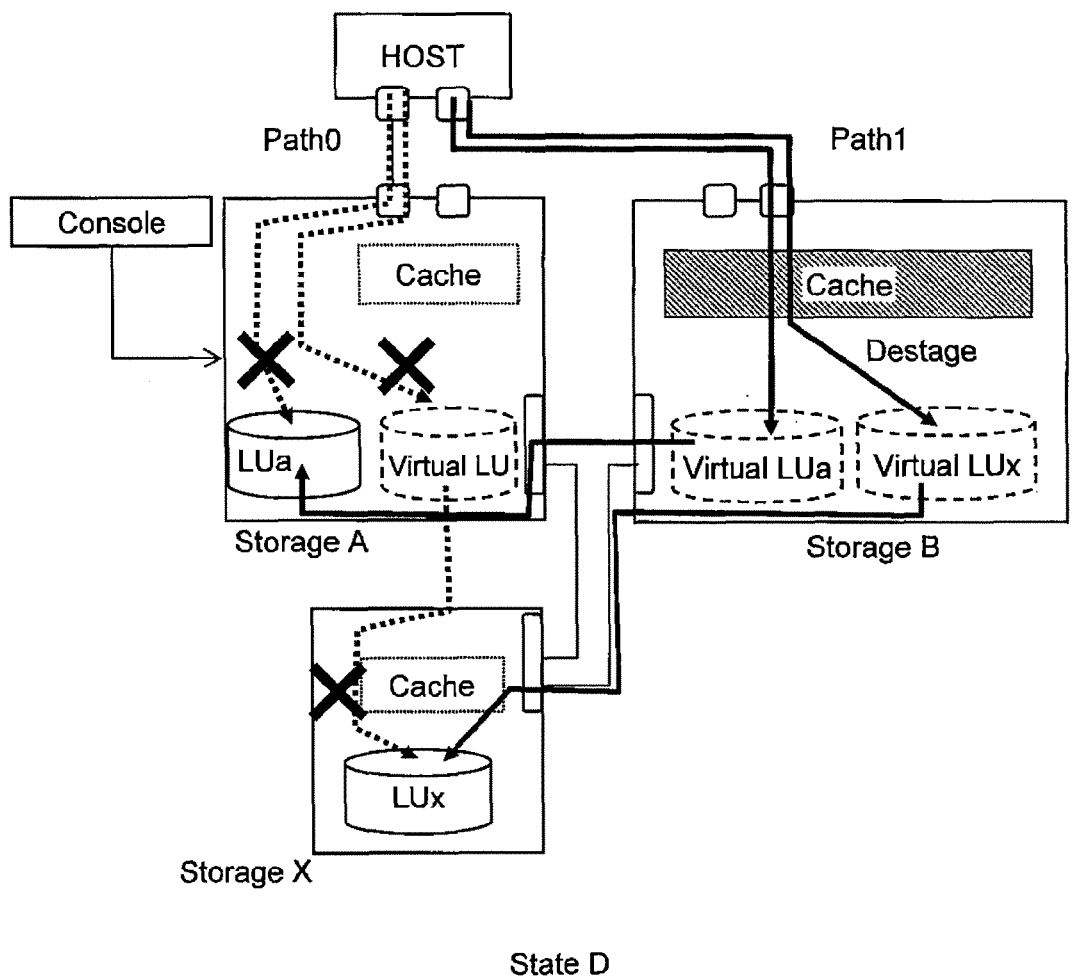
Figures 5, 13:
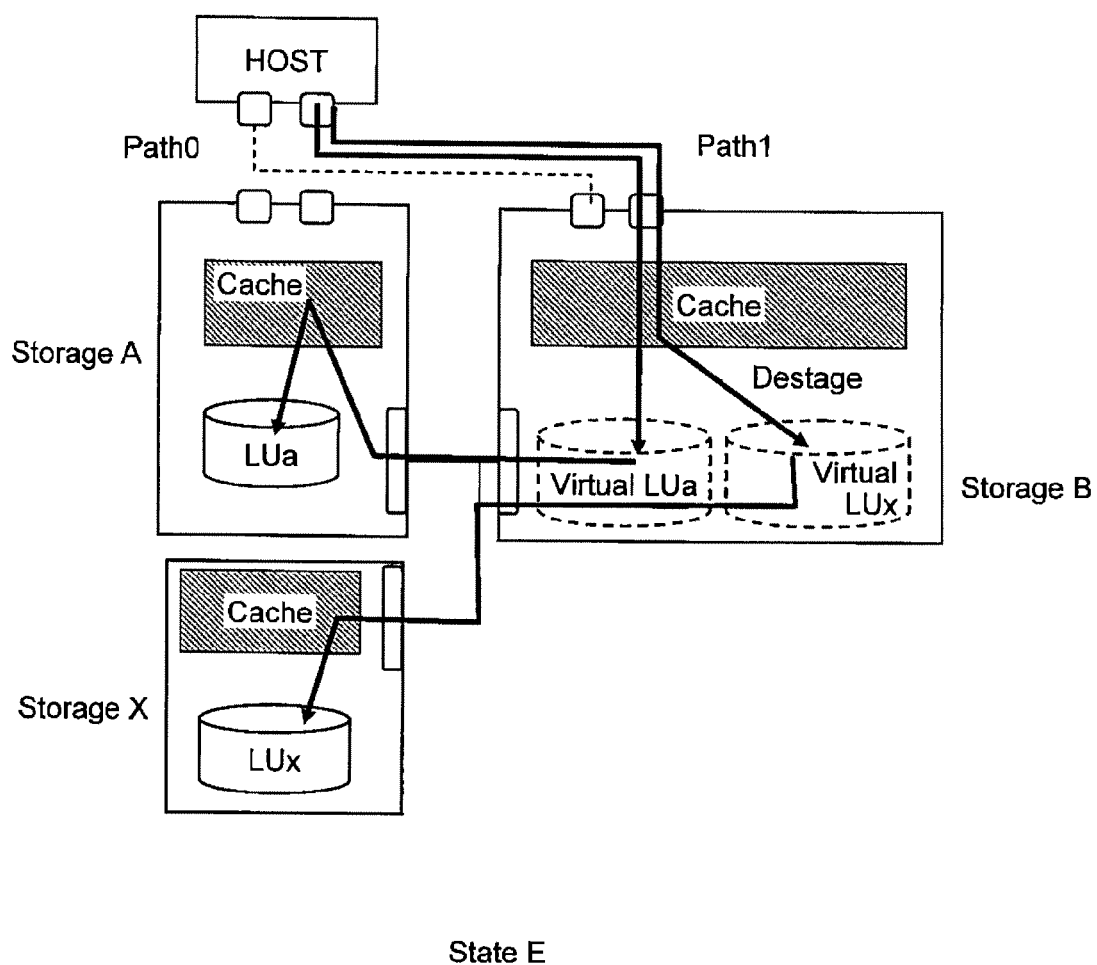

Detailed images of the above-noted processing operations will be explained using FIGS. 13-1 to 13-5. It should be noted that FIGS. 13-1 to 13-5 schematically show computer system configurations.

[State A: Initial State]

The state A shows an initial state of the migration-source storages A and X. This state corresponds to a state before a storage migration starts. In the state A, both the path 0 and the path 1 are physically connected to the storage A (and virtually connected to the storage X). However, the path 0 is operated in an active state and the path 1 is operated in a standby state.

In this case, I/O data issued from the host 100 to the path 0 is temporarily stored in the cache memory 203 of the storage A. Here, I/O data for the actual logical unit 211 of the storage A as an access destination is destaged from the cache memory 203 to the actual logical unit 211. On the other hand, I/O data for the actual logical unit 511 of the storage X as an access destination is destaged from the cache memory 203 and temporarily stored in the cache memory 503. Further, the I/O data is destaged from the cache memory 503 to the actual logical unit 511. Access from the storage A to the storage X is performed through the external storage connection interfaces 213 and 513.

[State B: Connection with Storage B and Migration Start Request]

In the state B, the migration-destination storage B is physically connected to the migration-source storage A. Then, a storage migration start request is reported from the management terminal 400 to the storage A. After that, the storage A applies a standby state to the writing of I/O data in the cache memory 203 and decides whether or not I/O data remains in the cache memory 203. If I/O data remains in the cache memory 203, the storage A destages all I/O data in the cache memory 203. At this time, I/O data for the actual logical unit 211 as an access destination is destaged to the actual logical unit 211. On the other hand, I/O data for the actual logical unit 511 as an access destination is destaged to the cache memory 503 and then destaged from the cache memory 503 to the actual logical unit 511. It should be noted that, in the figure, a destage path of I/O data is represented by thick-line arrow.

[State C: Write Continuation by Cache Bypass Mode]

In the state C, a mode of writing data for the cache memories 203 and 503 is switched to the cache-bypass mode. As a result of this, I/O data issued from the host 100 to the path 0 is controlled to a state where it is directly written in the actual logical unit 211 and directly written in the actual logical unit 511 via the virtual logical unit 212. In the figure, the writing path of I/O data in the cache-bypass mode is represented by thick-line arrow. During the time, the storage A sets the virtual logical units 311 and 312 to the storage B through the external storage connection interfaces 213 and 313. The virtual logical unit 311 denotes a virtual logical unit supporting the actual logical unit 211 of the storage A and the virtual logical unit 312 denotes a virtual logical unit supporting the actual logical unit 511 of the storage X. Here, the logical connection of the path 1 is set. As a result of this, paths to access the actual logical units 211 and 511 by the host 100 are logically multiplexed. However, in this stage, the path 1 is not physically connected and therefore I/O data flows only via the path 0.

[State D: Blocking of Path 0 and Opening of Path 1]

In the state D, the storage A blocks the path 0. The block of the path 0 is logically performed. By blocking the path 0, access to the actual logical unit 211 and the virtual logical unit 212 via the path 0 is blocked. On the other hand, the storage B opens the path 1 after the path 1 and the host 100 are physically connected. The physical connection of the path 1 is performed by the manager. The manager physically connects the path 1 after checking the block of the path 0 in the management screen 800 of the management terminal 400. As described above, the logical setting for the path 1 has been completed. Therefore, physical connection and communication through the path 1 are simultaneously possible. However, if the path 1 is physically connected before the path 0 is logically blocked, the writing in the actual logical units 211 and 511 via the path 0 and the writing in the actual logical units 211 and 511 via the path 1 are competitive. Therefore, as described in the present example, the path 1 is physically connected after the path 0 is logically blocked. It should be noted that a writing mode for the cache memory 303 in the storage B is set to the cache use mode. Therefore, data received via the path 1 is written in the cache memory 303 and then destaged in the virtual logical units 311 and 312.

On the other hand, the host 100 does not recognize the block or connection of paths on the storage side. Therefore, the host 100 that does not stop service provision transmits I/O data to the path 0 in the same way as the previous or past writing processing. However, at this time, the path 0 is blocked by the storage A. Therefore, the host 100 recognizes that an access to the actual logical units 211 and 511 via the path 0 fails. In this case, path switching software of the host 100 recognizes the path 1 as an alternate path of the path 0. Therefore, the path switching software of the host 100 then tries to access the actual logical units 211 and 511 via the path 1. At this time, if the path 1 is already opened, the host 100 can continuously access the actual logical units 211 and 511 via the path 1.

Here, immediately before the path switching, the writing of I/O data in the storage A via the path 0 is performed in the cache-bypass mode. Therefore, after this path switching, there is no I/O data destaged from the cache memories 203 and 503 to the actual logical units 211 and 511. Therefore, a case is not caused where, even after it is switched to the writing of I/O data via the path 1, the writings of data on the actual logical units 211 and 511 are competitive, so that the consistency of data is maintained.

[State E: Migration Completion State]

The state E denotes a state where a storage migration is completed by path switching. In this state, the storages A and X set the writing modes for the cache memories 203 and 503 to the cache use mode, respectively. By this means, I/O data of the host 100 is written in the cache memory 303 of the storage B and then destaged depending on the access destination. For example, I/O data for the actual logical unit 211 of the storage A is written in the cache memory 203 via the virtual logical unit 311 and then written in the actual logical unit 211. For example, I/O data for the actual logical unit 511 of the storage X is written in the cache memory 503 via the virtual logical unit 312 and then written in the actual logical unit 511.

It should be noted that communication of I/O data between the storages A and B is realized through the external storage connection interfaces 213 and 313, and communication of I/O data between the storages B and X is realized through the external storage connection interfaces 313 and 513. After the storage migration is completed, the path 0 is physically disconnected from the storage A. In the figure, although the path 0 is set as a standby path of the storage B, its use method is arbitrary.

[Content of Storage Migration Processing Operation]

Next, migration processing content according to Example 4 will be explained in view of differences from Example 3. Therefore, in the present example, FIG. 12 is also used for explanation. In the following, differences will be explained for each of components forming the computer system.

In the processing operations of the storage A, the processing content in processing 1205 and processing 1208 differs from that in Example 1. In processing 1205 and processing 1208, a different point from Example 1 is that the block object is the path 0 connecting between the host 100 and the storage A and is the connection established between the storage A and the storage X.

In the processing operations of the storage B, there is a difference from Example 3 in that the connection objects by the external storage connection interface 313 in processing 1302 include the storage X. Also, there is a difference from Example 3 in that the management objects of the logical unit management table 309 include the actual logical unit 311 of the storage X.

The processing operations of the management terminal 400 differ from those of Example 1 in that logical units of the migration objects include the logical unit of the storage X which is an external storage. Also, there is a difference in that, after connection of the path 1 is checked, the management terminal 400 transmits an instruction to the storage X migrated to an external storage of the storage B, such that the writing mode for the cache memory 503 is changed to the cache use mode.

Processes 1501 to 1504 in the storage X are new processing operations in the present example. First, processing 1501 is performed in a case where a positive result is obtained in processing 1213 in storage A. In processing 1501, I/O data of the cache memory 503 is destaged before a storage migration starts. In processing 1502, after the cache destage is completed, processing of switching the writing mode for the cache memory 503 to the cache-path-through mode is performed. Also, in processing 1503, processing of disconnecting the physical connection between the storage A and the storage X is performed. In processing 1504, based on the instruction from the management terminal 400, processing of switching the writing mode for the cache memory 503 of the storage X to the cache use mode is performed.

The processing operation differences between Example 4 and Example 3 have been described above. It should be noted that the host operation performed before or after a storage migration is the same as in Example 3.

TECHNICAL EFFECT OF EXAMPLE 4

As described above, the computer system according to Example 4 is the same as in Example 3, except for that processing of migrating to the storage B is performed even for the storage X that is externally connected to the storage A. Therefore, in the computer system according to Example 4, it is equally possible to realize the same effect as in Example 3.

DIFFERENCE OF CONNECTION TRANSITION STATE BETWEEN EXAMPLES

Finally, a difference of a connection transition state between examples will be explained. FIG. 14 shows correspondence relationships between the connection state of the storage A and the connection state of the storage B in each example.

If the connection state of the storage A is "currently connected," the storage B in all of Examples 1 to 4 is in a connection state of "disconnectable." Here, the state of "currently connected" can be provided in both the storage A and the storage B, where there is a path allowed to connect to a given logical unit and connected to the logical unit via the path. Also, the state of "disconnectable" can be provided only in the storage B, where connection with a path and logical unit on the storage B is not allowed before processing of migrating to the storage B does not start. The state of "disconnectable" is a default state of the storage B.

When the connection state of the storage A is "currently migrated," the storage B in all of Examples 1 to 4 is in a connection state of "currently migrated." Here, the state of "currently migrated" can be provided in both the storage A and the storage B, where the migration setting of a path and logical unit is performed for a migration-destination storage. It should be noted that, in this state, it is not still possible to connect to the logical unit of the migration object via a path on the side of the storage B.

When the connection state of the storage A is "migration completion," the connection state of the storage B in Examples 1 and 2 is "connection permission wait" and the connection state of the storage B in Examples 3 and 4 is "currently migrated." Here, the state of "migration completion" is provided only in the storage A, where the storage A recognizes that the setting processing of a path and logical unit on the side of the storage B is completed. However, in this state, it is not still possible to connect to the logical unit of the migration object via the path on the side of the storage B. Also, the state of "connection permission wait" can be provided only in the storage B, where migration processing is already completed and a physical path is always connected, that is, the use is possible at any time immediately before block permission.

When the connection state of the storage A is "block permission," the connection state of the storage B in Examples 1 and 2 is "currently connected." Here, the state of "block permission" can be provided only in the storage A, where the storage A recognizes that connection with a logical unit of the migration object via a path on the side of the storage B is allowed.

When the connection state of the storage A is "disconnection," the storage B in all of Examples 1 to 4 is in a connection state of "standby." Here, the state of "disconnection" can be provided only in the storage A, where an existing path of the storage A is logically disconnected after the completion of migration. In this case, even if an existing path is erroneously physically connected, access to a logical unit of the migration object via the path is not allowed. Also, the state of "standby" can be provided only in the storage B, where there is a path that can be connected to a logical unit of the migration object but the path is in a standby state.

OTHER EXAMPLES

The invention proposed in the present specification is not limited to the above-described examples but includes various changed examples. Actually, the above-described examples are provided to explain the present invention in an easily understood manner and need not necessarily have all the components described above. Also, regarding part of the components of each example, it is equally possible to add, remove or replace other components.

Also, by partly or fully designing the above-described configurations, functions, processing units and processing methods in, for example, an integrated circuit, it is possible to realize them as hardware. Information of the program, table and file for realizing each function can be provided in a recording apparatus such as a memory, hard disk and SSD (Solid State Drive), and a recording medium such as an IC card, SD card and DVD. Also, control lines and information lines required for explanation are shown, and it is not always true that all control lines and information lines of a product are necessarily shown. Actually, almost all configurations may be connected to each other.

REFERENCE SIGNS LIST

1 host
2 storage system (migration source)
3 host interface
4 storage controller
5 cache memory
6 logical unit
7 connection interface
12 storage system (migration destination)
13 host interface
14 storage controller
15 cache memory
16 logical unit
17 connection interface
100 host
200 storage A
201 host interface
202 storage controller
203 cache memory
204 virtual storage management program 205 cache control program
206 logical unit management program
207 migration path control program
208 migration-destination storage logical unit setting program
209 logical unit management table
210 storage apparatus basic information
211 actual logical unit
212 virtual logical unit
213 external storage connection interface
300 storage B
301 host interface
302 storage controller
303 cache memory
304 virtual storage management program
305 cache control program
306 logical unit management program
309 logical unit management table
310 storage apparatus basic information
311 virtual logical unit
312 virtual logical unit
313 external storage connection interface
400 management terminal
500 storage X
502 storage controller
503 cache memory
505 cache control program
511 actual logical unit
513 external storage connection interface
800 management screen
810 operation screen
811 auto selection button
812 manual selection button
820 operation screen
821 auto migration start button
822 manual edit setting button
830 operation screen

The invention claimed is:

1. A computer system comprising:
a host computer;
a first storage system having a first cache memory and a first logical unit; and
a second storage system having a second cache memory and a second logical unit,
wherein, when a connection destination of the host computer is migrated from the first storage system to the second storage system:
the first storage system is configured to apply a standby state to a writing of data for the first cache memory, destage data existing in the first cache memory to the first logical unit and then directly write data received via a first path from the host computer, in the first logical unit by bypassing the first cache memory such that the data is written via the first path in a cache-bypass mode immediately before storage migration;
the second storage system is configured to communicate with the first storage system, automatically set setting information of the first logical unit of a migration object into a management table of the second logical unit by designating the migration object, and set a writing mode for the second cache memory to the cache-bypass mode;
the first storage system is configured to logically block the first path after the writing mode is set to the cache-bypass mode in the second storage system; and
the second storage system, having received a report of a block of the first path, is configured to logically open a second path set in advance with the host computer and to be physically connected with the host computer, and, when the second storage system receives data via the second path, the second storage system is configured to write the data in the first logical unit via the second cache memory immediately after the first path is blocked and the second path is opened.

2. The computer system according to claim 1, wherein, after the first path is blocked and the second path is opened, the first storage system and the second storage system are configured to set writing modes for the first and second cache memories to a cache use mode, respectively.

3. The computer system according to claim 1, wherein the first logical unit includes a third logical unit that virtualizes an external storage system connected to the first storage system.

4. The computer system according to claim 1, further comprising a management terminal having:
a first operation screen in which the first logical unit is designated in a unit of the host computer; and a second operation screen in which a designation is performed in a unit of the first logical unit.

5. The computer system according to claim 4, wherein the management terminal updates connection states of the first and second paths in the first and second operation screens in real time.

6. A computer system comprising:
a host computer;
a first storage system having a first cache memory and a first logical unit; and
a second storage system having a second cache memory and a second logical unit,
wherein, when a connection destination of the host computer is migrated from the first storage system to the second storage system:
the first storage system is configured to apply a standby state to a writing of data for the first cache memory, destage data existing in the first cache memory to the first logical unit and then directly write data received via a first path from the host computer, in the first logical unit by bypassing the first cache memory such that the data is written via the first path immediately before storage migration;
the second storage system is configured to communicate with the first storage system, automatically set setting information of the first logical unit into a management table of the second logical unit and logically set a second path used for connection with the host computer;
the first storage system is configured to logically block the first path after a writing mode is set in the second storage system; and
after the first path is blocked, the second storage system is configured to open the second path after the second path and the host computer are physically connected, and the second storage system is configured to write data received through the second path in the first logical unit via the second cache memory immediately after the first path is blocked and the second path is opened.

7. The computer system according to claim 6, wherein, after a writing in the first logical unit starts via the second cache memory of the second storage system, the first storage system is configured to set a writing mode for the first cache memory to a cache use mode.

8. The computer system according to claim 6, wherein the first logical unit includes a third logical unit that virtualizes an external storage system connected to the first storage system.

9. The computer system according to claim 6, further comprising a management terminal having:
- a first operation screen in which the first logical unit is designated in a unit of the host computer; and
- a second operation screen in which a designation is performed in a unit of the first logical unit.

10. The computer system according to claim 9, wherein the management terminal updates connection states of the first and second paths in the first and second operation screens in real time.

11. A storage system having a cache memory and a logical unit, wherein:
- in a case of a migration source of storage system migration processing:
  - a standby state is applied to a writing of data for the cache memory and data existing in the cache memory is destaged to the logical unit;
  - data received from a host computer via a first path is directly written in the logical unit by bypassing the cache memory such that the data is written via the first path in a cache-bypass mode immediately before storage migration;
  - setting information of the logical unit is reported to a storage system of migration destination; and
  - the first path is blocked after a setting of a writing mode is reported from the storage system of migration destination; and
- in a case of a migration destination of the storage system migration processing:
  - communication with a storage system of migration source is performed to automatically set setting information of a logical unit on a side of a migration object in a management table of the logical unit by designating the migration object, and set a writing mode for the cache memory to the cache-bypass mode; and
  - after a first path between the storage system of migration source and a host computer is blocked after the setting of the writing mode, a second path logically set in advance with the host computer is opened and the storage system of migration destination is physically connected to the host computer, and, when data is received via the second path, the data is written in the logical unit immediately after the first path is blocked and the second path is opened.

12. The storage system according to claim 11, wherein:
- in a case of the migration source of the storage system migration processing, after the first path is blocked, a writing mode for the cache memory is set to a cache use mode; and
- in a case of the migration destination of the storage system migration processing, after the second path is opened, a writing mode for the cache memory is set to the cache use mode.

13. A storage system having a cache memory and a logical unit, wherein:
- in a case of a migration source of storage system migration processing:
  - a standby state is applied to a writing of data for the cache memory and data existing in the cache memory is destaged to the logical unit;
  - data received from a host computer via a first path is directly written in the logical unit by bypassing the cache memory such that the data is written via the first path in a cache-bypass mode immediately before storage migration;
  - the first path is blocked after a setting of a writing mode is reported from a storage system of migration destination; and
- in a case of a migration destination of the storage system migration processing:
  - communication with a storage system of migration source is performed to automatically set setting information of a logical unit on a side of a migration object into a management table of the logical unit by designating the migration object; and
  - after a first path between the storage system of migration source and a host computer is blocked after the setting of the writing mode, a second path is opened after the second path is physically connected to the host computer, and, when data is received via the second path, the data is written in the logical unit immediately after the first path is blocked and the second path is opened.

14. The storage system according to claim 13, wherein, in a case of the migration source of the storage system migration processing, after the first path is blocked, a writing mode for the cache memory is set to a cache use mode.

* * * * *